United States Patent
Wang et al.

(10) Patent No.: US 12,493,353 B2
(45) Date of Patent: Dec. 9, 2025

(54) CONTROL METHOD, ELECTRONIC DEVICE, AND STORAGE MEDIUM

(71) Applicant: BOE Technology Group Co., Ltd., Beijing (CN)

(72) Inventors: Jingru Wang, Beijing (CN); Fanhao Kong, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 749 days.

(21) Appl. No.: 17/841,697

(22) Filed: Jun. 16, 2022

(65) Prior Publication Data
US 2023/0027040 A1 Jan. 26, 2023

Related U.S. Application Data

(63) Continuation-in-part of application No. 17/610,148, filed as application No. PCT/CN2021/073713 on Jan. 26, 2021, now Pat. No. 12,211,314.

(51) Int. Cl.
*G06F 3/01* (2006.01)
*G06V 40/16* (2022.01)
*G06V 40/20* (2022.01)

(52) U.S. Cl.
CPC ............ *G06F 3/017* (2013.01); *G06V 40/172* (2022.01); *G06V 40/28* (2022.01)

(58) Field of Classification Search
CPC ...... G06F 3/017; G06V 40/172; G06V 40/28; G06V 10/7715; G06V 10/751; G06V 40/20
See application file for complete search history.

(56) References Cited

U.S. PATENT DOCUMENTS

| | | | |
|---|---|---|---|
| 9,998,651 B2 * | 6/2018 | Bandlamudi | .......... H04N 23/69 |
| 12,211,314 B2 * | 1/2025 | Jia | .......................... G06V 40/16 |
| 2001/0053292 A1 | 12/2001 | Nakamura | |
| 2006/0029277 A1 | 2/2006 | Funayama | |
| 2006/0291001 A1 | 12/2006 | Sung et al. | |
| 2007/0057966 A1 | 3/2007 | Ohno et al. | |

(Continued)

FOREIGN PATENT DOCUMENTS

| | | |
|---|---|---|
| CN | 102799855 A | 11/2012 |
| CN | 106648079 A | 5/2017 |

(Continued)

OTHER PUBLICATIONS

Bo Sun et al., "Emotion Analysis Based on Facial Expression Recognition in Smart Learning Environment", Modern Distance Education Research, pp. 96-103, vol. 2, 2015.

(Continued)

*Primary Examiner* — Manav Seth
(74) *Attorney, Agent, or Firm* — Ling Wu; Stephen Yang; Ling and Yang Intellectual Property

(57) ABSTRACT

Provided is a control method including obtaining a first image; performing face recognition and gesture recognition on the first image; turning on a gesture control function when a first target face is recognized from the first image and a first target gesture is recognized from the first image; and returning to the act of obtaining the first image when the first target face is not recognized from the first image or the first target gesture is not recognized from the first image.

16 Claims, 9 Drawing Sheets

(56) References Cited

U.S. PATENT DOCUMENTS

| | | |
|---|---|---|
| 2009/0279786 A1 | 11/2009 | Kasugai et al. |
| 2010/0098341 A1* | 4/2010 | Ju .................. G06V 40/175 |
| | | 382/209 |
| 2013/0088426 A1 | 4/2013 | Shigeta et al. |
| 2014/0062862 A1 | 3/2014 | Yamashita |
| 2014/0152557 A1 | 6/2014 | Yamamoto et al. |
| 2019/0341050 A1 | 11/2019 | Diamant et al. |
| 2020/0183556 A1 | 6/2020 | Liu |
| 2020/0272717 A1 | 8/2020 | Figueredo de Santana et al. |
| 2021/0216145 A1 | 7/2021 | Monge Nunez et al. |
| 2022/0198836 A1 | 6/2022 | Wu et al. |

FOREIGN PATENT DOCUMENTS

| | | | |
|---|---|---|---|
| CN | 108032836 A | 5/2018 | |
| CN | 108108649 * | 6/2018 | ............ G06F 21/32 |
| CN | 108108649 A | 6/2018 | |
| CN | 109269041 A | 1/2019 | |
| CN | 109862067 A | 6/2019 | |
| CN | 111178233 A | 5/2020 | |
| CN | 111901681 A * | 11/2020 | ......... H04N 21/4415 |
| EP | 2453384 A1 * | 5/2012 | ............ G06F 3/017 |
| JP | 2018195052 A | 12/2018 | |

OTHER PUBLICATIONS

Yo-Jen Tu et al., "Human Computer Interaction Using Face and Gesture Recognition".
Office Action dated Mar. 19, 2024 for U.S. Appl. No. 17/610,148.
Office Action dated Jun. 28, 2025 for CN202180000071.X and English Translation.

* cited by examiner

CONTROL METHOD, ELECTRONIC DEVICE, AND STORAGE MEDIUM

CROSS-REFERENCE TO RELATED APPLICATIONS

The present application is a continuation-in-part application of the U.S. application Ser. No. 17/610,148 filed on Nov. 9, 2021, which is U.S. National Phase Entry of International Application No. PCT/CN2021/073713 having an international filing date of Jan. 26, 2021. The entire contents of the above-identified applications are hereby incorporated by reference.

TECHNICAL FIELD

The present disclosure relates to, but is not limited to, the field of Human-Computer Interaction technologies, in particular to a control method, an electronic device, and a storage medium.

BACKGROUND

With continuous development of sciences and technologies, computers will be more and more widely used in many fields. Human-Computer Interaction is a main path for computers to read and understand information from human. One of key points in smart device technologies is how to achieve human-computer interaction more conveniently and effectively.

SUMMARY

Following is a summary about the subject matter described in the present disclosure in detail. The summary is not intended to limit the protection scope of claims.

An embodiment of the present disclosure provides a control method, an electronic device, and a storage medium.

In one aspect, an embodiment of the present disclosure provides a control method, which includes: obtaining a first image; performing face recognition and gesture recognition on the first image; turning on a gesture control function when a first target face is recognized from the first image and a first target gesture is recognized from the first image; and returning to the act of obtaining the first image when the first target face is not recognized from the first image or the first target gesture is not recognized from the first image.

In some exemplary embodiments, the above control method further includes providing first prompt information on a display interface when the first target face is recognized from the first image and the first target gesture is recognized from the first image, wherein the first prompt information is used for prompting a user that the gesture control function has been turned on.

In some exemplary embodiments, the above control method further includes providing second prompt information on a display interface when the first target face is recognized from the first image and the first target gesture is not recognized from the first image, wherein the second prompt information is used for prompting a user to adjust a gesture.

In some exemplary embodiments, the above control method further includes providing third prompt information on a display interface when the first target face is not recognized from the first image, wherein the third prompt information is used for prompting a user to adjust an angle of a face facing an acquisition device.

In some exemplary embodiments, the above control method further includes providing fourth prompt information on the display interface when the first target face is still not recognized from a first image of another frame re-acquired after the third prompt information is provided, wherein the fourth prompt information is used for prompting that the user has no operation authority.

In some exemplary embodiments, the above control method further includes obtaining a second image after the gesture control function is turned on, and performing face recognition and gesture recognition on the second image; and turning on a function corresponding to a second target gesture when a second target face is recognized from the second image and the second target gesture is recognized from the second image.

In some exemplary embodiments, the above control method further includes returning to the act of obtaining the second image when the second target face is not recognized from the second image or the second target gesture is not recognized from the second image; and turning off the gesture control function when the second target face is not recognized from second images of consecutive multiple frames within a set time period.

In some exemplary embodiments, the performing face recognition and gesture recognition on the first image includes: performing face recognition on the first image; and performing gesture recognition on the first image after the first target face is recognized from the first image.

In some exemplary embodiments, the performing face recognition on the first image includes: detecting whether the first image includes a face; detecting whether the face in the first image is occluded when it is detected that the first image includes the face; detecting whether the face in the first image is a front face when it is detected that the face in the first image is not occluded; performing feature extraction on the first image to obtain face data to be recognized when it is detected that the face in the first image is the front face; comparing the face data to be recognized with target face data in a face database; returning a result that the first target face is recognized from the first image when there is target face data matched with the face data to be recognized in the face database; and returning a result that the first target face is not recognized from the first image when it is detected that the first image does not include a face, or that the face in the first image is occluded, or that the face in the first image is not a front face, or that there is no target face data matched with the face data to be recognized in the face database.

In some exemplary embodiments, the above control method further includes registering a target face in the face database; wherein the registering the target face in the face database includes: obtaining a registered image; detecting whether the registered image includes a face; returning to the act of obtaining the registered image when it is detected that the registered image does not include a face; detecting whether the face in the registered image is occluded when it is detected that the registered image includes the face; returning to the act of obtaining the registered image when it is detected that the face in the registered image is occluded; detecting whether the face in the registered image is a front face when it is detected that the face in the registered image is not occluded; returning to the act of obtaining the registered image when it is detected that the face in the registered image is not a front face; performing feature extraction on the registered image to obtain face data to be registered when it is detected that the face in the registered image is a front face; comparing the face data to be registered with registered face data in the face database;

providing fifth prompt information on a display interface when there is registered face data matched with the face data to be registered in the face database, wherein the fifth prompt information is used for prompting that a user is already registered; and assigning an identifier to the face data to be registered when there is no registered face data matched with the face data to be registered in the face database, and saving the face data to be registered in the face database.

In some exemplary embodiments, the performing gesture recognition on the first image includes: detecting whether the first image includes a human body; segmenting the human body to obtain a plurality of segmented regions when it is detected that the first image includes the human body, and detecting whether the segmented regions include an arm region; detecting whether the arm region includes a hand region when it is detected that the segmented regions include the arm region; performing gesture recognition on the hand region when it is detected that the arm region includes the hand region; returning a result that the first target gesture is recognized from the first image when a gesture in the hand region is recognized as the first target gesture; and returning a result that the first target gesture is not recognized from the first image when it is detected that the first image does not include a human body, or that the segmented regions do not include an arm region, or that the arm region does not include a hand region, or that the gesture in the hand region is not the first target gesture.

In some exemplary embodiments, the first target gesture includes an OK gesture.

In some exemplary embodiments, the turning on the function corresponding to the second target gesture includes: determining a mapping position of a palm of one hand on a display interface when the second target gesture is the palm of one hand, and selecting an icon corresponding to the mapping position; and turning on a function indicated by the icon corresponding to the mapping position after the palm of one hand is detected and when it is detected that the second target gesture is a first of one hand.

In another aspect, an embodiment of the present disclosure further provides an electronic device, which includes a display, a processor, and a memory. The display is connected to the processor and is adapted to provide a display interface, and the memory is adapted to store a computer program, and when the computer program is executed by the processor, acts of the aforementioned control method are implemented.

In another aspect, an embodiment of the present disclosure further provides a computer-readable storage medium storing a computer program, wherein when the computer program is executed by a processor; acts of the above control method are implemented.

After the drawings and the detailed descriptions are read and understood, the other aspects may be comprehended.

BRIEF DESCRIPTION OF DRAWINGS

Accompanying drawings are used to provide a further understanding of technical solutions of the present disclosure and constitute a part of the specification to explain the technical solutions of the present disclosure together with embodiments of the present disclosure, and do not constitute any limitation on the technical solutions of the present disclosure. Shapes and sizes of one or more components in the accompanying drawings do not reflect real scales, and are only for a purpose of schematically illustrating contents of the present disclosure.

DETAILED DESCRIPTION

Figure 1:
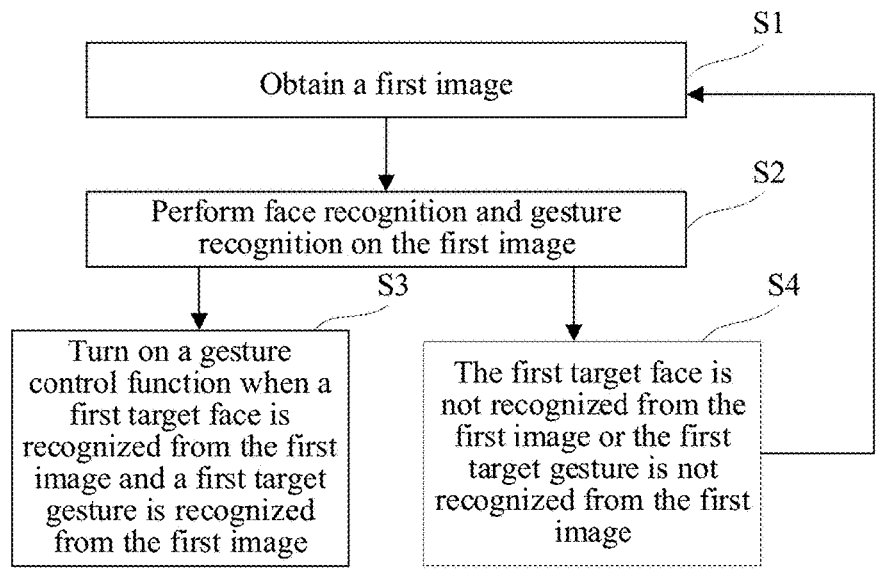
FIG. 1 is a flowchart of a control method according to at least one embodiment of the present disclosure.

Hereinafter embodiments of the present disclosure will be described in detail with reference to the accompanying drawings. The embodiments may be implemented in a plurality of different forms. Those of ordinary skills in the art will readily understand a fact that implementations and contents may be transformed into one or more of forms without departing from the spirit and scope of the present disclosure. Therefore, the present disclosure should not be construed as being limited only to what is described in the following embodiments. The embodiments and features in the embodiments in the present disclosure may be combined randomly if there is no conflict.

In the drawings, a size of one or more constituent elements, or a thickness or a region of a layer, is sometimes exaggerated for clarity. Therefore, an embodiment of the present disclosure is not necessarily limited to the size, and shapes and sizes of a plurality of components in the drawings do not reflect real scales. In addition, the drawings schematically show ideal examples, and an implementation of the present disclosure is not limited to the shapes or values shown in the drawings.

The "first", "second", "third" and other ordinal numbers in the present disclosure are used to avoid confusion of constituent elements, not to provide any quantitative limitation. In the present disclosure, "plurality" means two or more in quantity.

In the present disclosure, for the sake of convenience, wordings such as "central", "upper", "lower", "front", "rear", "vertical", "horizontal", "top", "bottom", "inner", "outer" and the others describing the orientations or positional relations are used to depict positional relations of constituent elements with reference to the drawings, which are only convenient for describing the specification and simplifying description, rather than for indicating or implying that the apparatus or element referred to must have a specific orientation, or must be constructed and operated in a particular orientation, and therefore, those wordings cannot be construed as limitations on the present disclosure. The positional relations of the constituent elements may be appropriately changed according to a direction in which constituent elements are described. Therefore, the wordings are not limited in the specification, and may be replaced appropriately according to a situation.

In the present disclosure, the terms "installed", "connected", and "coupled" shall be understood in their broadest sense unless otherwise explicitly specified and defined. For example, a connection may be a fixed connection, or a detachable connection, or an integrated connection; it may be a mechanical connection, or an electrical connection; it may be a direct connection, or an indirect connection through middleware, or an internal connection between two elements. Those of ordinary skills in the art may understand meanings of the above terms in the present disclosure according to a situation.

Nowadays, large-sized display devices (for example, 98-inch and 110-inch display devices) are usually used in exhibition halls, outdoor plazas and other scenes. When a large-size display device is not equipped with a touch-control function, a function of the display apparatus usually needs to be controlled through a hardware device such as a remote controller. However, the remote controller and other hardware devices generally do not have a recognition function, and can be used by anyone, which will cause a lot of inconvenience and security problems.

Embodiments of the present disclosure provide a control method and an electronic device, which support a user to control an electronic device in the air, may alleviate dependence of the user on hardware devices such as a remote controller, and may save a cost of electronic device and improve user experience.

FIG. 1 is a flowchart of a control method according to at least one embodiment of the present disclosure. As shown in FIG. 1, the control method provided by this exemplary embodiment includes the following acts S1-S4.

Act S1, obtaining a first image.

Act S2, performing face recognition and gesture recognition on the first image.

Act S3, turning on a gesture control function when a first target face is recognized from the first image and a first target gesture is recognized from the first image.

Act S4, returning to the act of obtaining a first image, that is, returning to the act S1, when the first target face or the first target gesture is not recognized from the first image. After returning to the act S1, a first image of another frame may be obtained to continue face recognition and gesture recognition.

In this exemplary embodiment, the first target face being recognized from the first image indicates that face recognition of the first image is successful, and the first target gesture being recognized from the first image indicates that gesture recognition of the first image is successful. The first target face not being recognized from the first image indicates that face recognition of the first image fails, and the first target gesture not being recognized from the first image indicates that gesture recognition of the first image fails.

In some exemplary embodiments, the control method according to this embodiment may be performed by an electronic device having a display interface. For example, the electronic device may be a large-sized display device, a smart TV, and the like. However, this embodiment is not limited thereto.

In some exemplary embodiments, obtaining the first image may include obtaining the first image acquired through an acquisition device. In some examples, the acquisition device may include a camera. For example, the camera may take a real-time image of a scene facing the electronic device. For a first image acquired through the acquisition device in real time, after the first target face and the first target gesture are not recognized from a first image of one frame, face recognition and gesture recognition may be performed for a first image of another frame acquired in real time. However, this embodiment is not limited thereto. In some examples, an image acquired through an acquisition device and preprocessed may be obtained.

In some exemplary embodiments, the acquisition device may be integrated in the electronic device, or may be connected to the electronic device by a wired or wireless manner to achieve information interaction with the electronic device. However, this embodiment is not limited thereto.

In some exemplary embodiments, the electronic device may perform the control method according to this embodiment after being started; or, the electronic device performs the control method according to this embodiment after the acquisition device is started. However, a trigger mode of the control method is not limited in this embodiment.

In some exemplary embodiments, the first target face being not recognized from the first image may include at least one of the following situations: no face is detected from the first image, and a face recognized from the first image is not the first target face. The first target gesture being not recognized from the first image may include at least one of the following situations: no hand region is detected from the first image, and a gesture recognized from the first image is not the first target gesture. However, this embodiment is not limited thereto.

In some exemplary embodiments, the first target face may include a face registered in a face database, or a face registered in a face database and set as an administrator. However, this embodiment is not limited thereto.

In some exemplary embodiments, the first target gesture may include an OK gesture. However, this embodiment is not limited thereto. For example, the first target gesture may include a V-shaped gesture, or a gesture of number 8. Or, in some examples, the first target gesture may be formed by a gesture combined of two hands, for example, a love gesture.

In some exemplary embodiments, once the gesture control function is turned on, a registered user may use a second target gesture to control the electronic device. For example, content may be displayed on a display interface of the electronic device in response to a recognized second target gesture of the registered user, or the electronic device may be controlled to play a corresponding audio or video file. The second target gesture may be different from the first target gesture. For example, the second target gesture may include at least one of the following: a palm of one hand and a first of one hand. However, this embodiment is not limited thereto. In some examples, the second target gesture may be formed by a gesture combined of two hands, for example, a pause gesture.

According to the control method provided by this exemplary embodiment, whether to turn on the gesture control function is determined based on dual recognition results of face recognition and gesture recognition. When both face recognition and gesture recognition are successful, the gesture control function may be turned on, so that a target user may achieve long-distance, non-contact control the electronic device, and chaos that exist when a plurality of people use gestures to manipulate the electronic device may be avoided. In some application scenarios (e.g., exhibition halls), dependence of a user on a hardware device such as a remote controller may be alleviated. In addition, based on the control method of this embodiment, the electronic device does not require a touch-control function, which saves the cost of the electronic device and improves the user experience.

In some exemplary embodiments, the control method according to this embodiment further include: providing first prompt information on a display interface when a first target face and a first target gesture are recognized from a first image, wherein the first prompt information is used for prompting a user that a gesture control function has been turned on. In some examples, the first prompt information may include the following: the gesture control function has been turned on. However, this embodiment is not limited thereto. For example, the electronic device may provide the first prompt information to the user through audio.

In some exemplary embodiments, the control method according to this embodiment further include: providing second prompt information on a display interface when a first target face is recognized from a first image and a first target gesture is not recognized from the first image, wherein the second prompt information is used for prompting a user to adjust a gesture. In some examples, the first target gesture is an OK gesture, and the second prompt information may include the following content: Please make an OK gesture to turn on the gesture control function. However, this embodiment is not limited thereto. For example, the electronic device may provide the second prompt information to the user through audio.

In some exemplary embodiments, the control method according to this embodiment further include: providing third prompt information on a display interface when a first target face is not recognized from a first image, wherein the third prompt information is used for prompting a user to adjust an angle of a face facing an acquisition device. In some examples, the third prompt information may include the following content: Please face a camera for recognition. However, this embodiment is not limited thereto. For example, the electronic device may provide the third prompt information to the user through audio.

In some exemplary embodiments, the control method according to this embodiment further include: providing fourth prompt information on a display interface when a first target face is still not recognized from a first image of another frame re-acquired after the third prompt information is provided, wherein the fourth prompt information is used for prompting that a user has no operation authority. In some examples, after reminding the user to adjust the angle of the face facing the acquisition device through the third prompt information, if face recognition for the re-acquired first image still fails, the fourth prompt information may be displayed on the display interface of the electronic device. For example, the fourth prompt information may include the following content: You do not have operation authority, please contact the administrator. However, this embodiment is not limited thereto. For example, the electronic device may provide the fourth prompt information to the user through audio.

In the above exemplary embodiments, the user may be provided with targeted prompt information based on recognition results of face recognition and gesture recognition, so that the user may know the recognition results of face and gesture and adaptively adjust a face position or a gesture, which is conducive to improving the user experience.

In some exemplary embodiments, the control method according to this embodiment further include: obtaining a second image after the gesture control function is turned on, and performing face recognition and gesture recognition on the second image; and turning on a function corresponding to a second target gesture when a second target face and the second target gesture are recognized from the second image. In this exemplary embodiment, the second image is an image obtained after the gesture control function is turned on. For example, the second image is an image acquired through the acquisition device in real time after the gesture control function is turned on, or an image obtained by preprocessing the image acquired through the acquisition device in real time after the gesture control function is turned on. After the gesture control function is turned on, the function corresponding to the second target gesture of the second target face may be performed. For example, an operation icon on the display interface of the electronic device is selected in response to the second target gesture of the second target face. However, this embodiment is not limited thereto.

In some exemplary embodiments, the second target face recognized from the second image is consistent with the first target face recognized from the first image, that is, a same registered user controls the electronic device with gestures after turning on the gesture control function. Or, in some examples, the second target face may be inconsistent with the first target face, that is, one registered user turns on the gesture control function, and then another registered user controls the electronic device with gestures. However, this embodiment is not limited thereto.

In some exemplary embodiments, the control method according to this embodiment further include: returning to the act of obtaining the second image when the second target face is not recognized from the second image or the second target gesture is not recognized from the second image; and turning off the gesture control function when the second target face is not recognized from second images of consecutive multiple frames within a set time period. In some examples, the set time period may be 5 seconds. In this exemplary embodiment, whether to turn off the gesture control function is determined according to face recognition results of multi-frame second images within a set time period. However, this embodiment is not limited thereto. For example, when both face recognition and gesture recognition of the second image fail, the gesture control function may be turned off.

In some exemplary embodiments, the control method according to this embodiment further include: third prompt information may be provided on the display interface when the second target face is not recognized from the second image, wherein the third prompt information is used for prompting a user to adjust an angle of a face facing the acquisition device; and sixth prompt information for prompting the user to adjust a gesture may be provided on the display interface when the second target face is recognized from the second image and a second target gesture is not recognized from the second image. For example, the sixth prompt information may include the following content: Please make a registered gesture to activate a corresponding function. However, this embodiment is not limited thereto.

In some exemplary embodiments, performing face recognition and gesture recognition on the first image includes: performing face recognition on the first image; and performing gesture recognition on the first image after the first target face is recognized from the first image. In this exemplary embodiment, face recognition and gesture recognition are performed on the first image in sequence, and gesture recognition is performed only after face recognition is successful, which may save processing resources. However, this embodiment is not limited thereto. In some examples, face recognition and gesture recognition may be performed on the first image simultaneously. Or, gesture recognition may be performed on the first image before face recognition.

In some exemplary embodiments, performing face recognition on the first image includes: detecting whether the first image includes a face; detecting whether the face in the first image is occluded when it is detected that the first image includes a face; detecting whether the face in the first image is a front face when it is detected that the face in the first image is not occluded; performing feature extraction on the first image to obtain face data to be recognized when it is detected that the face in the first image is the front face; comparing the face data to be recognized with target face data in a face database; returning a result that the first target face is recognized from the first image when there is target face data matched with the face data to be recognized in the face database; and returning a result that the first target face is not recognized from the first image when it is detected that the first image does not include a face, or that the face in the first image is occluded, or that the face in the first image is not a front face, or that there is no target face data matched with the face data to be recognized in the face database. In this exemplary embodiment, face recognition is achieved by sequentially performing face detection, occlusion detection, posture detection, feature extraction, and comparison on the first image.

In some exemplary embodiments, the control method according to this embodiment further include: registering a target face in a face database; In some examples, registering the target face in the face database includes: obtaining a registered image; detecting whether the registered image includes a face; returning to the act of obtaining a registered image when it is detected that the registered image does not include a face; detecting whether the face in the registered image is occluded when it is detected that the registered image includes a face; returning to the act of obtaining a registered image when it is detected that the face in the registered image is occluded; detecting whether the face in the registered image is a front face when it is detected that the face in the registered image is not occluded; returning to the act of obtaining a registered image when it is detected that the face in the registered image is not a front face; performing feature extraction on the registered image to obtain face data to be registered when it is detected that the face in the registered image is a front face; comparing the face data to be registered with already registered face data in the face database; providing fifth prompt information on a display interface when there is registered face data matched with the face data to be registered in the face database, wherein the fifth prompt information is used for prompting that the user is already registered; and assigning an identifier to the face data to be registered when there is no registered face data matched with the face data to be registered in the face database, and saving the face data to be registered in the face database. In this exemplary embodiment, face registration is achieved by sequentially performing face detection, occlusion detection, posture detection, feature extraction, and comparison on the registered image.

In some exemplary embodiments, performing gesture recognition on the first image includes: detecting whether the first image includes a human body; segmenting the human body to obtain a plurality of segmented regions when it is detected that the first image includes the human body, and detecting whether the segmented regions include an arm region; detecting whether the arm region includes a hand region when it is detected that the segmented regions include an arm region; performing gesture recognition on the hand region when it is detected that the arm region includes a hand region; returning a result that the first target gesture is recognized from the first image when a gesture in the hand region is recognized as the first target gesture; and returning a result that the first target gesture is not recognized from the first image when it is detected that the first image does not include a human body, or that the segmented regions do not include an arm region, or that the arm region does not include a hand region, or that the gesture in the hand region is not the first target gesture. In this exemplary embodiment, a success rate of gesture detection may be improved by performing human body detection, human body segmentation, arm region detection, and hand region detection on the first image in sequence, and performing gesture recognition in the hand region.

In some exemplary embodiments, turning on a function corresponding to the second target gesture includes: determining a mapping position of a palm of one hand on the display interface when the second target gesture is the palm of one hand, and selecting an icon corresponding to the mapping position; and turning on a function indicated by the icon corresponding to the mapping position after the palm of one hand is detected and when it is detected the second target gesture is a first of one hand. In some examples, after a registered user's palm of one hand is detected, an icon (e.g., a file icon) corresponding to a mapping position is illuminated by using the mapping position of the palm of one hand on the display interface, and then a file corresponding to the icon may be controlled to open after the registered user's first of one hand is detected. However, this embodiment is not limited thereto. In some examples, registered users may preset a correspondence between gestures and control operations according to their respective usage habits or needs. After the second target gesture is recognized, a control operation corresponding to the recognized second target gesture may be performed according to a preset correspondence.

The control method according to this embodiment will be illustrated by some examples below.

Figure 2:
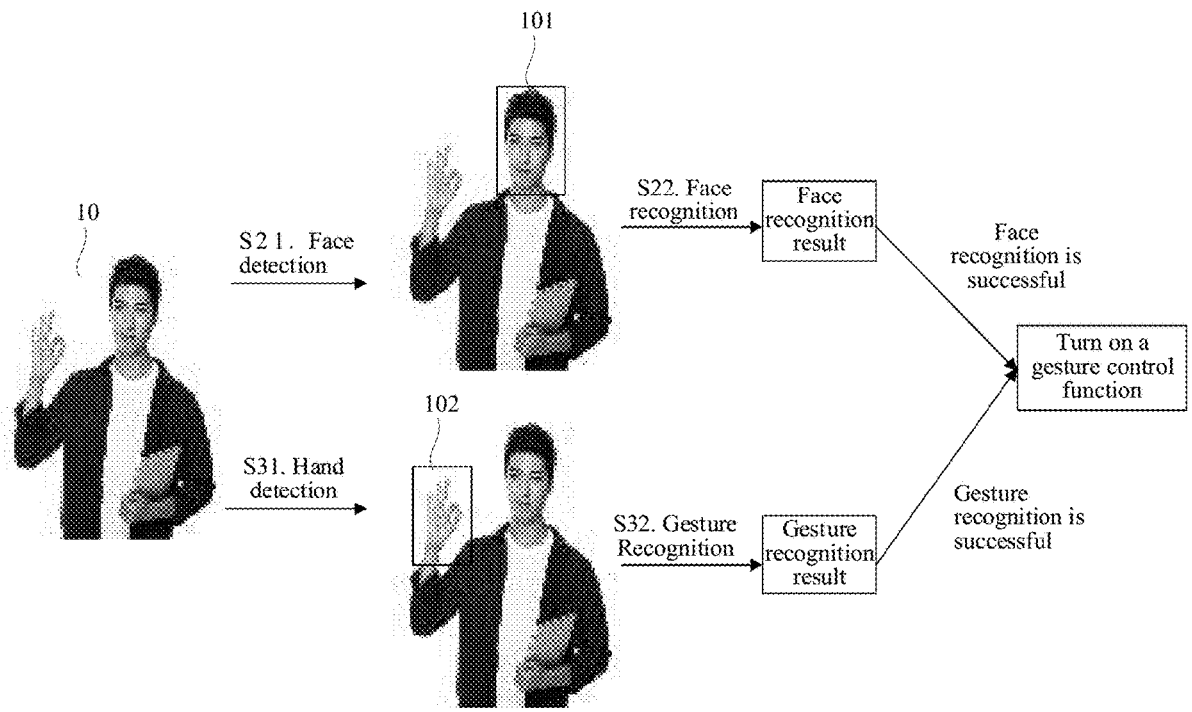
FIG. 2 is an exemplary flowchart of a control method according to at least one embodiment of the present disclosure.

FIG. 2 is an exemplary flowchart of a control method according to at least one embodiment of the present disclosure. In some exemplary embodiments, after obtaining a first image, face recognition may be performed on the first image by using a face model to obtain a face recognition result, and gesture recognition may be performed on the first image by using a gesture model to obtain a gesture recognition result. According to the results of face recognition and gesture recognition, it is then determined whether to turn on a gesture control function. In some examples, the first image may be acquired through an acquisition device in real time. In some examples, the face model may include a face detection model and a face recognition model. The face detection model is configured to be used to detect a face region from the first image, and the face recognition model is configured to be used to perform face recognition on the face region. The gesture model may include a hand detection model and a gesture recognition model. The hand detection model is configured to be used to detect a hand region from the first image, and the gesture recognition model is configured to be used to perform gesture recognition on the hand region. However, this embodiment is not limited thereto.

As shown in FIG. 2, the control method according to this exemplary embodiment includes the following acts.

Act S20, obtaining a first image. For example, a first image 10 may be obtained, through an acquisition device.

Act S21, performing face detection on the first image by using a face detection model. In some examples, when the first image 10 includes a face, a face region 101 may be detected in the first image 10 by using a face detection model; when no face is detected by using the face detection model, returning a result that face recognition on the first image fails. In some examples, the face region 101 is a rectangular frame region where a face is located. However, this embodiment is not limited thereto.

Act S22, performing face recognition on the face region 101 by using a face recognition model to obtain a face recognition result. In some examples, a face recognition result is that a first target face is recognized in the first image, that is, face recognition is successful; or, the face recognition result is that face recognition fails.

Act S31, performing hand detection on the first image by using a hand detection model. In some examples, when the first image 10 includes a hand, a hand region 102 may be detected in the first image 10 by using a hand detection model; when no hand is detected in the first image by using the hand detection model, returning a result that hand recognition on the first image fails. In some examples, the hand region 102 may be a rectangular frame region where a hand is located. However, this embodiment is not limited thereto.

Act S32, performing gesture recognition on the hand region 102 by using a gesture recognition model to obtain a gesture recognition result. In some examples, a gesture recognition result may be that a first target gesture (for example, an OK gesture) is recognized in the first image, that is, gesture recognition is successful; or, the gesture recognition result is that gesture recognition fails.

In some exemplary embodiments, when the gesture recognition result is that gesture recognition is successful and the face recognition result is that face recognition is successful, the gesture control function is turned on. In a case that gesture recognition fails or face recognition fails, a first image of a next frame may be obtained for face and gesture recognition again. For example, a first image of a next frame acquired through the acquisition device is obtained for face recognition and gesture recognition again.

In some exemplary embodiments, the face detection model is only responsible for detecting a face region from a first image, and the hand detection model is only responsible for detecting a hand region from the first image. The face detection model and the hand detection model may be trained separately to achieve different functions. In some examples, the face detection model may be an SSD detection model, and the hand detection model may be a mobileNetV1-ssd model. However, this embodiment is not limited thereto.

In some exemplary embodiments, a resnet50 network architecture may be used for the face recognition model, and a mobileNetV2 network architecture may be used for the gesture recognition model. However, this embodiment is not limited thereto.

In some exemplary embodiments, the face recognition model may be used to identify whether a first target face is included in a first image based on a face database. In some examples, the face recognition model may include an occlusion detection module, a posture detection module, a feature extraction module, and a comparison module. The occlusion detection module is configured to be used to detect whether a face in a face region is occluded. The gesture detection module is configured to be used to detect whether a face in a face region is a front face or not. The feature extraction module is configured to be used to perform feature extraction on a face region. The comparison module is configured to be used to compare face data obtained by the feature extraction module with face data in a face database, and determine whether a target face is recognized according to a comparison result.

Figure 3:
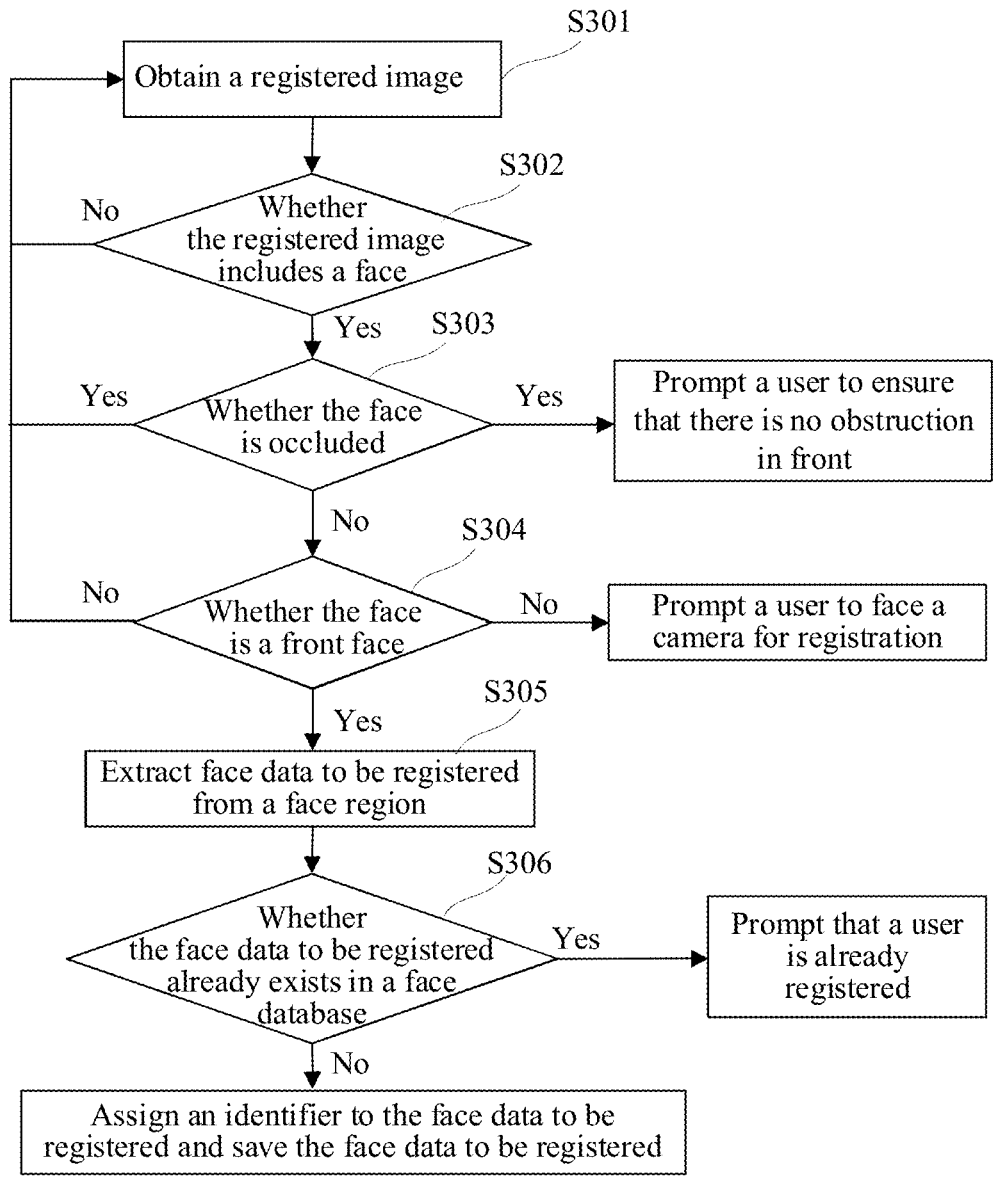
FIG. 3 is an exemplary flowchart of a face registration process according to at least one embodiment of the present disclosure.

FIG. 3 is an exemplary flowchart of a face registration process according to at least one embodiment of the present disclosure. In some examples, the electronic device may be controlled to enter the face registration process by triggering a registration button provided on the electronic device or a registration icon displayed on the display interface. However, this embodiment is not limited thereto.

As shown in FIG. 3, the face registration process of this exemplary embodiment includes the following acts.

Act S310, obtaining a registered image. For example, a registered image acquired through an acquisition device in real time may be acquired.

Act S302, detecting whether the registered image includes a face region by using a face detection model. In some examples, when a face region is detected in a registered image by using a face detection model, act S303 is performed; when no face region is detected in the registered image by using the face detection model, the process returns to the act S301, that is, a registered image of a next frame is obtained for processing.

Act S303, detecting whether a face in the face region is occluded by using an occlusion detection module. In some examples, when it is detected that a face in the face region is not occluded, act S304 is performed; when it is detected that the face in the face region is occluded, the process returns to the act S301, that is, a registered image of a next frame is obtained for processing, and a user is prompted to ensure that there is no occlusive object in front.

Act S304, detecting whether the face in the face region is a front face by using a posture detection module. In some examples, when it is detected that the face in the face region is a front face, act S305 is performed; when it is detected that the face in the face region is not a front face, the process returns to the act S301, that is, a registered image of a next frame is obtained for processing, and the user is prompted to face a camera for registration.

Act S305, extracting face data to be registered from the face region by using a feature extraction module.

Act S306, comparing the face data to be registered with registered face data in a face database by using a comparison module, and determining whether the face data to be registered already exists in the face database according to a comparison result. When the face data to be registered already exists in the face database, the user is prompted to have already been registered, for example, a prompt content that the user has been registered is displayed on a display interface. When the face data to be registered does not exist in the face database, an ID is assigned to the face data to be registered, and the assigned ID and the face data to be registered are stored in the face database to achieve update of the face database.

In some examples, the comparison module may be used to calculate a similarity between the face data to be registered and each piece of registered face data in the face database. When there is a similarity that meets a threshold condition (for example, the similarity is greater than 0.7), it means that registered face data matches the face data to be registered already exists in the face database. When there is no similarity that meets the threshold condition, it means that there is no face data to be registered in the face database. However, this embodiment is not limited thereto.

Figure 4:
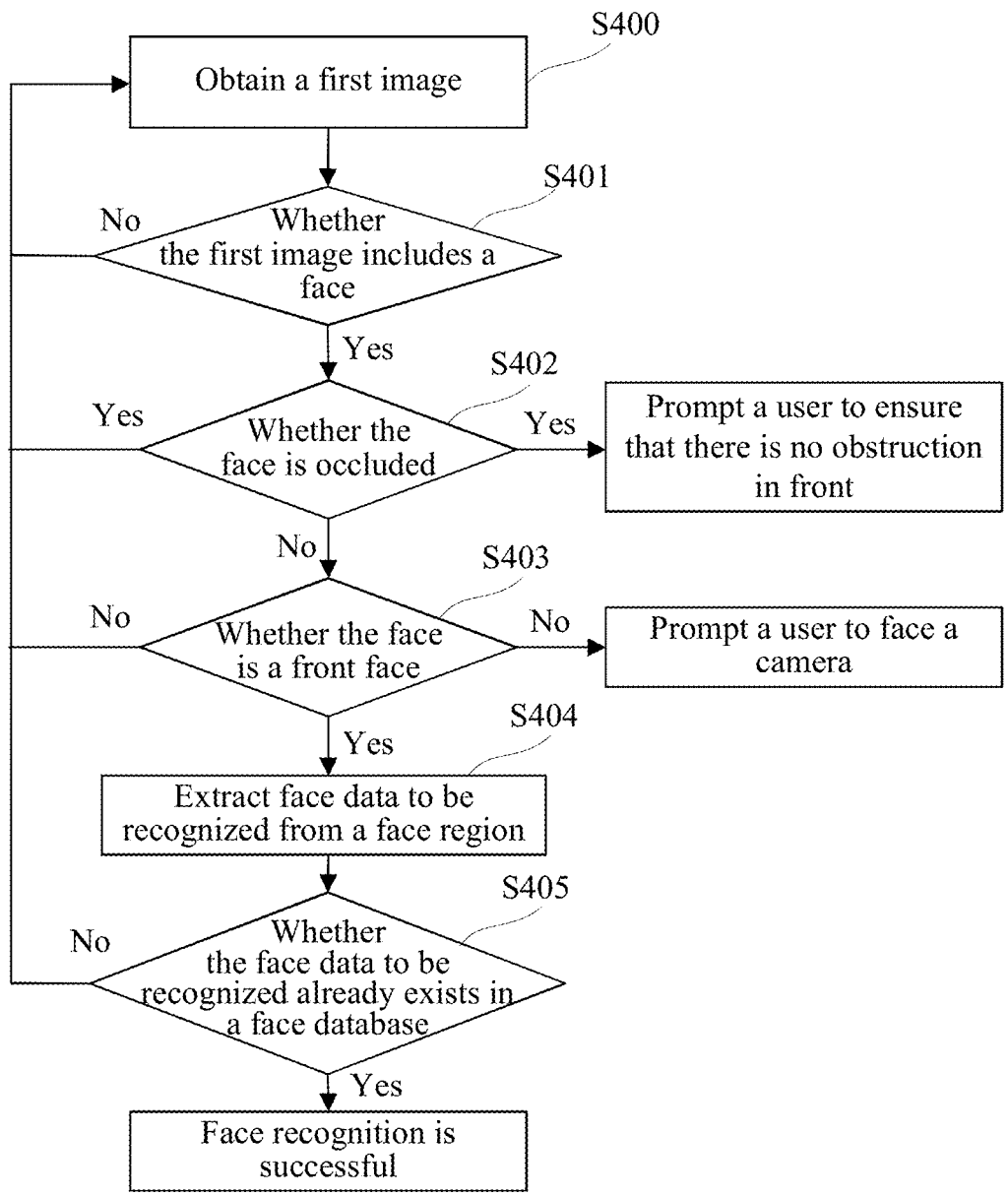
FIG. 4 is an exemplary flowchart of a face recognition process according to at least one embodiment of the present disclosure.

FIG. 4 is an exemplary flowchart of a face recognition process according to at least one embodiment of the present disclosure. In this example, a face recognition process of a first image is taken as an example. A face recognition process of a second image is similar to that of the first image, and will not be repeated here.

As shown in FIG. 4, after obtaining the first image through act S400, the face recognition process provided by this exemplary embodiment includes the following acts.

Act S401, detecting whether the first image includes a face by using a face detection model. In some examples, when a face is detected in the first image by using the face detection model, act S402 is performed; when no face is detected in the first image by the face detection model, the process returns to the act S400, for example, a first image of another frame obtained through an acquisition device in real time is obtained for processing.

Act S402, detecting whether a face in a face region is occluded by using an occlusion detection module. In some examples, when it is detected that the face in the face region is not occluded, act S403 is performed; when it is detected that the face in the face region is occluded, the process returns to the act S400, for example, a first image of another frame acquired through the acquisition device in real time is obtained for processing, and a user is prompted to ensure that there is no occlusive object in front.

Act S403, detecting whether the face in the face region is a front face by using the posture detection module. In some examples, when it is detected that the face in the face region is a front face, act S404 is performed; when it is detected that the face in the face region is not a front face, the process returns to the act S400, for example, a first image of another frame obtained through the acquisition device in real time is obtained for processing, and the user is prompted to face a camera.

Act S404, extracting face data to be recognized from the face region by using a feature extraction module.

Act S405, comparing the face data to be recognized with target face data in a face database by using a comparison module, and determining whether the face data to be recognized already exists in the face database according to a comparison result. In some examples, when there is target face data matching the face data to be recognized in the face database, a result that face recognition is successful is returned, that is, a first target face may be recognized from the first image; when there is no target face data matching the face data to be recognized in the face database, a result that face recognition fails is returned, and the process returns to the act S400, that is, a first image of another frame obtained through the acquisition device in real time is obtained for processing.

In some examples, the target face data in the face database may include all registered face data in the face database, or may include registered face data selected as an administrator in the face database. However, this embodiment is not limited thereto.

In some examples, the comparison module may be used to calculate a similarity between the face data to be recognized and each piece of target face data in the face database. When there is a similarity that meets a threshold condition (for example, the similarity is greater than 0.7), it means that the face data to be recognized already exists in the face database, and the first target face recognized in the first image is a target face whose similarity between the face database and the face data to be recognized meets the threshold condition. When there is no similarity that meets the threshold condition, it means that there is no face data to be recognized in the face database.

In some exemplary embodiments, the hand detection model may include a human body detection module, a human body segmentation module, an arm segmentation module, and a hand detection module. The human body detection module is configured to be used to detect whether the first image includes a human body. The human body segmentation module is configured to be used to segment the detected human body. The arm segmentation module is configured to be used to segment an arm region in a human body region. The hand detection module is configured to be used to detect a hand region from an arm region. However, this embodiment is not limited thereto.

Figure 5:
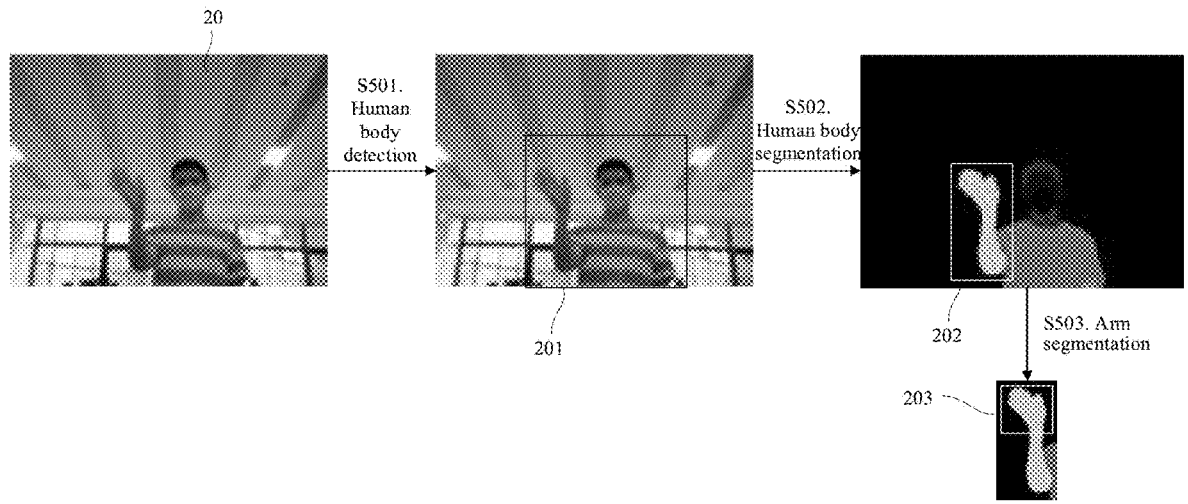
FIG. 5 is an exemplary flowchart of a gesture recognition process according to at least one embodiment of the present disclosure.

FIG. 5 is an exemplary flowchart of a hand recognition process according to at least one embodiment of the present disclosure. In this example, a gesture recognition process of a first image is taken as an example. A gesture recognition process of a second image is similar to that of the first image, and will not be repeated here.

As shown in FIG. 5, in some exemplary embodiments, the gesture recognition process may include the following acts.

Act S500, obtaining a first image. For example, a first image 20 is obtained through an acquisition device.

Act S501, detecting whether the first image includes a human body by using a human body detection module. In some examples, when it is detected that the first image 20 includes a human body, a human body region 201 where the human body is located is determined; when it is detected that the first image does not include a human body, it indicates that gesture recognition fails, and the process returns to the act S500, for example, a first image of another frame obtained through the acquisition device in real time is obtained for processing. In some examples, the human body region 201 may be a rectangular frame region. However, this embodiment is not limited thereto.

Act S502, segmenting the detected human body region 201 by using a human body segmentation module. In some examples, the human body in the human body region 201 may be divided into regions such as hair, face, neck, arms, and torso. For example, different regions may be marked with different colors or with different gray scales. However, this embodiment is not limited thereto.

Act S503, segmenting an arm region 202 from the human body region 201 by using an arm segmentation module. In some examples, the arm segmentation module may be used to detect whether the segmented human body includes an arm. When it is detected that the human body region does not include an arm, it indicates that gesture recognition fails, and the process returns to the act S500, for example, a first image of another frame obtained through the acquisition device in real time is obtained for processing. When it is detected that the human body region 201 includes an arm, an arm region 202 is segmented from the human body region 201, and act S504 is performed.

Act S504, detecting whether the arm region 202 includes a hand region by using a hand detection module. In some examples, when it is detected that the arm region 202 does not include a hand region, it indicates that gesture recognition fails, and the process returns to the act S500, for example, a first image of another frame obtained through the acquisition device in real time is obtained for processing. When it is detected that the arm region 202 includes a hand region 203, gesture recognition is performed on the hand region 203 by using a gesture recognition model to recognize a gesture in the hand region 203. For example, a gesture in the hand region 203 is a palm of one hand.

In this exemplary embodiment, by sequentially detecting the human body, the arm region, and the hand region in the first image, a situation that it is difficult to perform detection since the hand region occupies a small area in a picture may be avoided, thereby improving a success rate of gesture detection.

Figure 6:
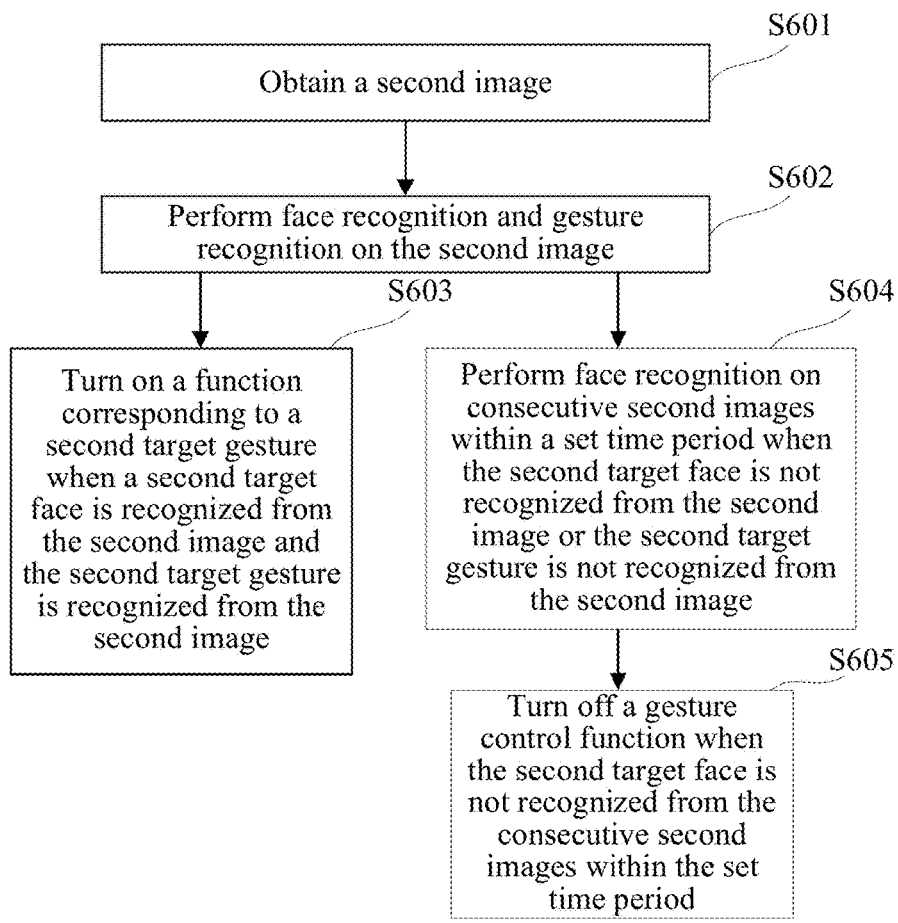
FIG. 6 is an exemplary flowchart of face recognition and gesture recognition after a gesture control function is turned on according to at least one embodiment of the present disclosure.

FIG. 6 is an exemplary flowchart of face recognition and gesture recognition after a gesture control function is turned on according to at least one embodiment of the present disclosure. As shown in FIG. 6, in some exemplary embodiments, the flowchart of face recognition and gesture recognition after the gesture control function is turned on includes the following acts.

Act S601, obtaining a second image. For example, a second image may be obtained through an acquisition device.

Act S602, performing face recognition and gesture recognition on the second image. A process of face recognition and gesture recognition for the second image may refer to the process of face recognition and gesture recognition for the first image, and will not be repeated here.

Act S603, turning on a function corresponding to a second target gesture when a second target face is recognized from the second image and a second target gesture is recognized from the second image. For example, the second target face may be a registered face in a face database.

Act S604, performing face recognition on second images of consecutive multiple frames within a set time period when the second target face is not recognized from the second image, or the second target gesture is not recognized from the second image. In this act, when the second target face is not recognized from the second image or the second target gesture is not recognized from the second image, a second image of another frame acquired through an acquisition device may be obtained to continue face recognition and gesture recognition until both face recognition and gesture recognition are successful. When face recognition of the second images of consecutive multiple frames fails within a set time period, act S605 may be performed.

Act S605, turning off the gesture control function when the second target face is not recognized from the second images of consecutive multiple frames within the set time period.

In this exemplary embodiment, after the gesture control function is turned on, whether to turn off the gesture control function is determined according to a face recognition result of second images of consecutive multiple frames. However, this embodiment is not limited thereto. For example, the gesture control function may be turned off in the act S604.

In some exemplary embodiments, after the gesture control function is turned on, the display interface of the electronic device may be controlled based on a face recognition result and a gesture recognition result of a second image.

Figure 7:
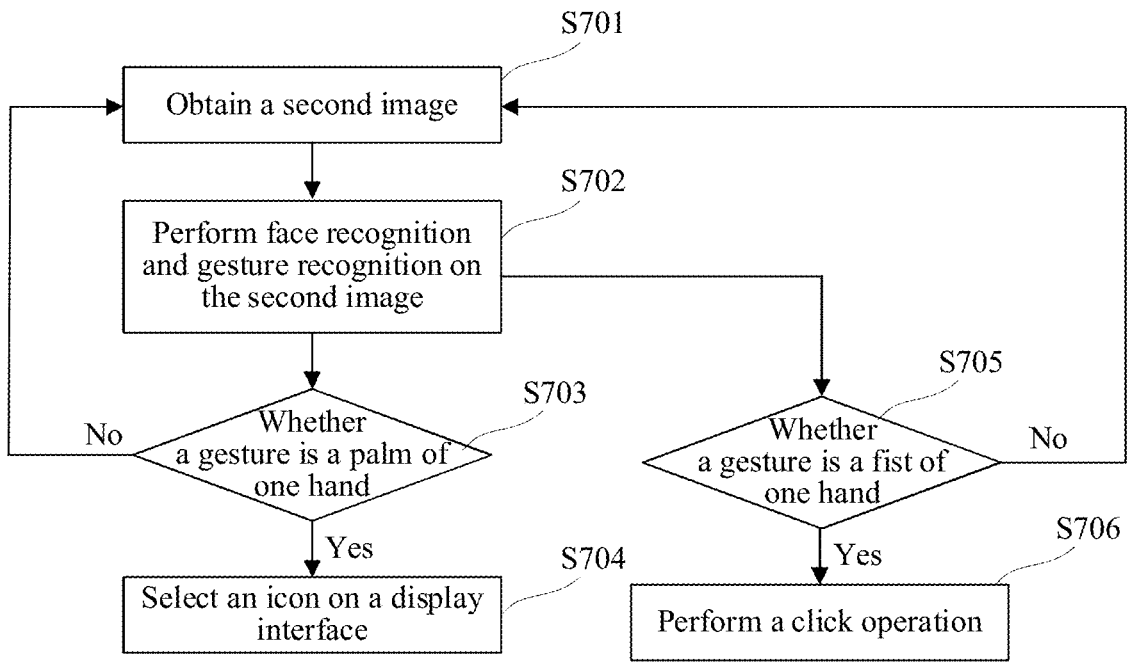
FIG. 7 is an exemplary flowchart of a gesture interaction process after a gesture control function is turned on according to at least one embodiment of the present disclosure.

FIG. 7 is an exemplary flowchart of a gesture interaction process after a gesture control function is turned on according to at least one embodiment of the present disclosure. In this example, a case where second target gestures recognized from a second image are a palm of one hand and a first of one hand in sequence is taken as an example for description. As shown in FIG. 7, in some exemplary embodiments, a second image is obtained in act S701, and face recognition and gesture recognition are performed on the second image in act S702. In this example, a case where both face recognition and gesture recognition are successful is taken as an example for description. After recognizing a gesture in the second image, the gesture interaction process of this exemplary embodiment includes the following acts.

Act S703, determining whether the gesture recognized in the second image is a palm of one hand. In some examples, when the recognized gesture is not a palm of one hand, the process returns to the act S701, for example, a second image of another frame acquired through the acquisition device in real time is obtained for processing. When the recognized gesture is a palm of one hand, act S704 is performed.

Act S704, determining a mapping position of a palm in a hand region on a display interface, and selecting an icon corresponding to the mapping position, for example, illuminating an icon corresponding to the mapping position.

In some exemplary embodiments, a mapping relationship may be established between the second image and the display interface, and the mapping position of position coordinates of the hand region where the palm is located on the display interface may be determined according to the mapping relationship, for example, the mapping position of the hand region on the display interface may be a point position. When a region corresponding to the point position is a clickable range of an icon, an icon corresponding to the point position is illuminated; when the region corresponding to the point position is not within the clickable range of the icon, a cursor is displayed at the point position. For example, when the cursor is displayed at this point position, movement of the cursor on the display interface may be controlled by moving the palm. However, this embodiment is not limited thereto.

In some exemplary embodiments, after a gesture is recognized as a palm of one hand in a second image of a previous frame and after a gesture is recognized in a second image of a current frame, S705 may be performed, that is, whether a gesture recognized in a second image is a first of one hand is determined. When the recognized gesture is not a first of one hand, the process returns to the act S701, for example, a second image of another frame acquired through the acquisition device in real time is obtained for processing. When the recognized gesture is a first of one hand, act S706 is performed, for example, a click operation is performed on a selected icon on the display interface, for example, a first of one hand corresponds to a double-click operation, so as to activate a function corresponding to an icon. In some examples, the icon is a file icon, and a file content corresponding to the file icon may be controlled to be displayed on the display interface by clenching a first of one hand; or, the icon is an application icon, and an application corresponding to the application icon may be controlled to be opened on the display interface by clenching a first of one hand. However, this embodiment is not limited thereto.

In some exemplary embodiments, the correspondence between gestures and control operations may be preset. After both face recognition and gesture recognition of the second image are successful in the act S702, a matching control operation may be searched for in the preset correspondence according to the recognized gesture. When the matching control operation is found, the matching control operation may be performed. When no matching control operation is found, the process returns to the act S701, for example, a second image of another frame acquired through the acquisition device in real time is obtained for processing.

In this exemplary embodiment, through dual recognition results of face recognition and gesture recognition, a target user may control the electronic device in the air (i.e., remote and non-contact control), which may compensate for inconvenience and safety problems of using a hardware device such as a remote controller, and enhance user experience.

Figure 8:
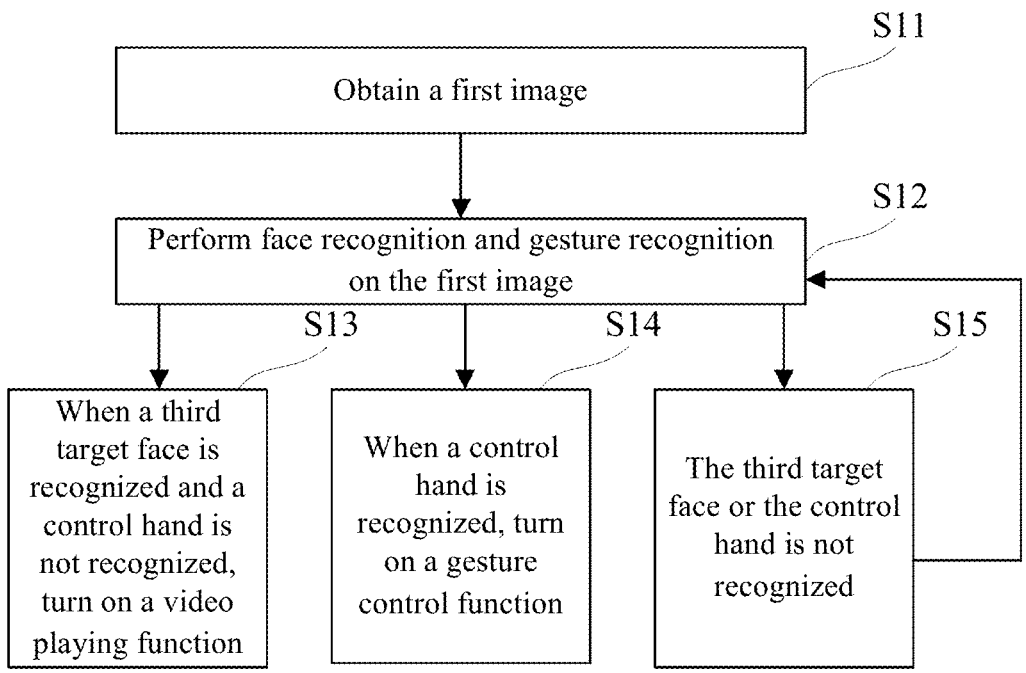
FIG. 8 is another flowchart of a control method according to at least one embodiment of the present disclosure.

FIG. 8 is another flowchart of a control method according to at least one embodiment of the present disclosure. In some exemplary embodiments, as shown in FIG. 8, the control method may include the following process.

In act S11, a first image is obtained.

In act S12, face recognition and gesture recognition are performed on the first image.

In act S13, when a third target face is recognized from at least one frame of the first image and a control hand is not recognized from the at least one frame of the first image, a video playing function is turned on.

In act S14, when a control hand is recognized from at least one frame of the first image, a gesture control function is turned on.

In act S15, when the third target face or the control hand is not recognized, the method returns to the act S12, and face recognition and gesture recognition are performed again on a next frame of the first image.

In some exemplary embodiments, obtaining the first image may include: obtaining a plurality of frames of the first image acquired by an acquisition device in real time, or obtaining a plurality of frames of the first image acquired by the acquisition device and preprocessed. The acquisition device may include a camera. Face recognition and gesture recognition can be performed on each frame of the first image in turn for the plurality of frames of the first image acquired by the acquisition device. For example, face recognition and gesture recognition can be performed synchronously for each frame of the first image. Or, for each frame of the first image, face recognition can be performed first and then gesture recognition is performed, or gesture recognition can be performed first and then face recognition is performed. This embodiment is not limited thereto.

In some exemplary embodiments, performing face recognition on the first image in act S12 may include: determining a first tracking identification (ID) of at least one face detected from the first image; determining whether the at least one face is a front face in a plurality of consecutive frames of the first image according to the first tracking identification of the at least one face; and when a same face that is a front face is detected in the plurality of consecutive frames of the first image, a result that the third target face is recognized is returned. Herein, different faces may have different first tracking identifications. In this example, the situation of a same face in a plurality of frames of the first image can be tracked through the first tracking identification. In some examples, when a face detected from a frame of the first image does not have a first tracking identification, it indicates that the face is detected for the first time, and a first tracking identification may be established for the face. Once a first tracking identification is established for a face, subsequent recognition results for the face can be correlated and recorded through the first tracking identification. In some examples, the plurality of consecutive frames of the first image may include a current frame of the first image and at least one frame of the first image preceding the current frame of the first image. In this example, the third target face may include a face detected as a front face. In this example, an identity of a user need not to be recognized through the face, but only whether the face is facing the acquisition device is recognized. In some application scenarios, this example can reduce the conditions for users to use the interactive functions, which is beneficial to expanding potential users.

In some exemplary embodiments, the starting the video playing function in act S13 may include playing a preset video file. For example, in exhibition halls or science and technology museums, after the third target face is recognized, an interaction teaching video or science popularization video can be automatically played. For example, by playing the interaction teaching video, a cost of manual teaching of the interactive function usage can be reduced.

In some exemplary embodiments, performing gesture recognition on the first image in the act S12 may include: determining a second tracking identification of at least one hand detected from the first image; determining a position and a gesture of the at least one hand in a plurality of consecutive frames of the first image according to the second tracking identification of the at least one hand; and recognizing a control hand from the at least one hand according to the position and the gesture of the at least one hand in the plurality of consecutive frames of the first image. Herein, different hands may have different second tracking identifications. In this example, the situation of a same hand in a plurality of frames of the first image can be tracked through the second tracking identification. In some examples, when a hand detected from a frame of the first image does not have a second tracking identification, it indicates that the hand is detected for the first time, and a second tracking identification may be established for the hand. Once a second tracking identification is established for the hand, subsequent recognition results for the hand can be correlated and recorded through the second tracking identification. In some examples, the plurality of consecutive frames of the first image may include a current frame of the first image and at least one frame of the first image preceding the current frame of the first image.

In some exemplary embodiments, recognizing a control hand from the at least one hand according to the position and the gesture of the at least one hand in the plurality of consecutive frames of the first image may include: when a same hand is detected in consecutive M frames of the first image, and it is recognized that the hand is in a first gesture in X frames of the first image among the M frames of the first image, and a distance of movement of the hand in any two adjacent frames of the first image among the M frames of the first image is less than or equal to a first threshold, the hand is recognized as a control hand, wherein X is less than or equal to M, and X and M can both be integers. In this example, the control hand may be a hand that appears in consecutive M frames, not moved, and is in the first gesture in the X frames. In some examples, the first gesture may be the same as or different from the first target gesture and the second target gesture. For example, the first gesture may include a palm of one hand with fingers being together. In this example, the gesture control function can be turned on by recognizing the control hand, and the control hand has the subsequent interactive control right. In some scenarios, a user can make the first gesture with his/her hand to start the gesture control function after simply learning from an interaction video, which can reduce the starting conditions for the interactive functions and facilitate operation of the user. However, this embodiment is not limited thereto. In some other examples, for a scenario with higher security, the face and the hand detected from the first image may be matched, and in an example, the gesture control function is turned on when there is a matched face and hand. For example, position coordinates of the head and the hand of each person in the first image may be extracted by using a human body key point model; the Euclidean distance between the center point of a face detection box and the position coordinates extracted by using the key point model, and the Euclidean distance between the center point of a hand detection box and the position coordinates extracted by using the key point model, are respectively calculated; when the Euclidean distance between the center point of the face detection box and the position coordinates extracted by using the key point model is less than the diagonal length of the face detection box, the face is considered to belong to someone, and when the Euclidean distance between the center point of the hand detection box and the position coordinates extracted by using the key point model is less than the diagonal length of the hand detection box, the hand is considered to belong to someone, so that the face and the hand can be matched. In other examples, the gesture control function may be turned on when a first target face and a control hand are recognized.

In some exemplary embodiments, recognizing a control hand from the at least one hand according to the position and the gesture of the at least one hand in the plurality of consecutive frames of the first image may further include: when a plurality of control hands are detected in the recognition process of a frame of the first image, selecting, from the plurality of control hands, the control hand with the largest average area of trajectory in the consecutive M frames of the first image as the ultimate control hand. In some examples, if one control hand is recognized from a frame of the first image, the control hand is the hand having the manipulation right after the gesture control function is turned on. When a plurality of control hands are recognized from a frame of the first image, an ultimate control hand can be determined according to the average area of trajectory in a plurality of consecutive frames of the first image.

In some exemplary embodiments, after the gesture control function is turned on, the control method of the present embodiment may further include: opening a first-level functional interface on a display interface, and controlling the first-level functional interface according to a gesture of the control hand. After the gesture control function is turned on, the control hand has the right to control the display interface, which can be controlled from a distance. In some examples, when it is recognized that the control hand is in a second gesture, movement of a cursor in the first-level functional interface can be controlled according to the movement of the second gesture. For example, the second gesture may be the same as or different from the first gesture. In some examples, when it is recognized that the control hand is in a third gesture, a function indicated by a corresponding icon at a mapping position of the control hand on the display interface can be turned on. Herein the third gesture may be different from the second gesture. For example, the second gesture may be a palm of one hand with fingers being together, and the third gesture may be an L-shaped gesture or a first of one hand. In this example, different operations in the first-level functional interface can be implemented by making different gestures with the control hand. This example can increase the interest of interaction and sense of technology through gesture interaction.

In some exemplary embodiments, turning on a function indicated by a corresponding icon at a mapping position of the control hand on the display interface may include opening a second-level functional interface indicated by the icon. The method of the present embodiment may further include at least one of the following: controlling a display size adjustment operation of the second-level functional interface according to a gesture change of the control hand; controlling a page turning operation in the second-level functional interface according to a gesture of the control hand and a moving direction of the gesture; and controlling an operation of returning to the first-level functional interface from the second-level functional interface according to a gesture of the control hand and a duration of the gesture. In this example, various operations on the second-level functional interface may be implemented by the gesture change, position change and duration of the control hand, thus increasing the interest of interaction and sense of technology.

Figure 9:
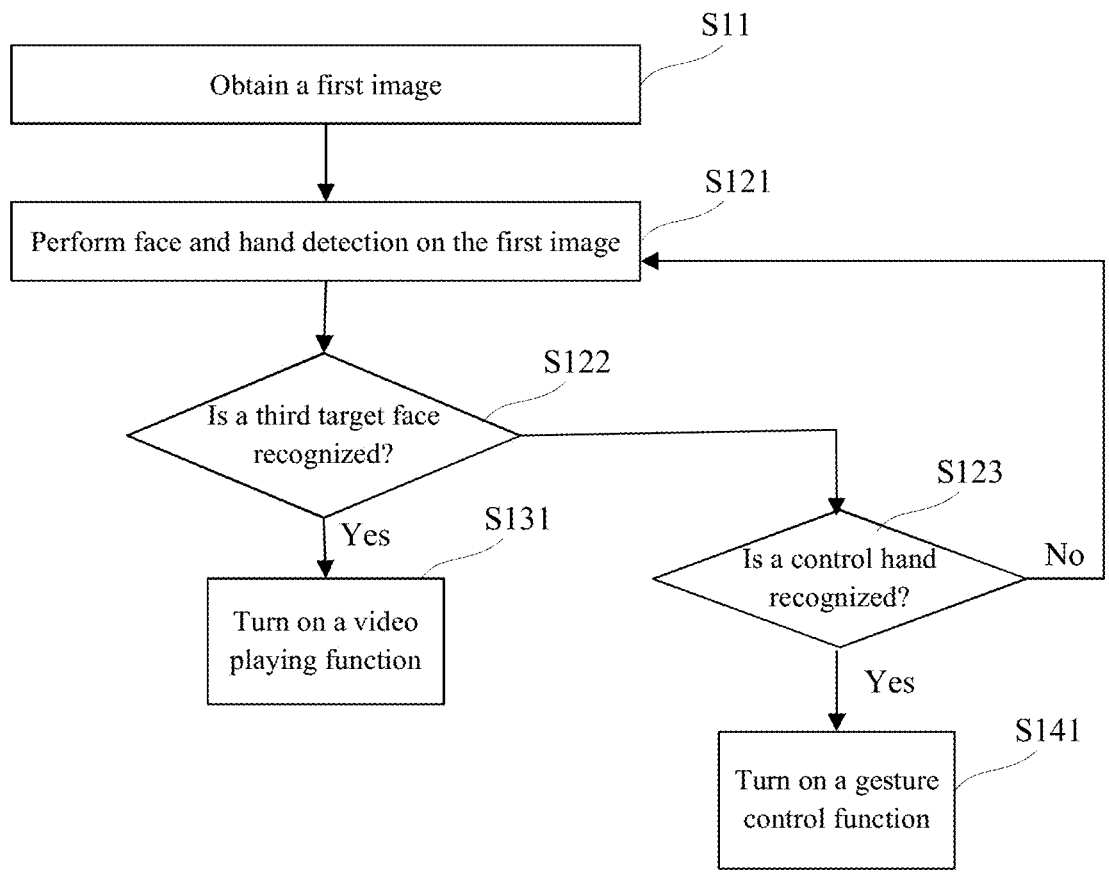
FIG. 9 is another exemplary flowchart of a control method according to at least one embodiment of the present disclosure.

FIG. 9 is an exemplary flowchart of a control method according to at least one embodiment of the present disclosure. The control method of the embodiment may be performed by an electronic device (e.g., an interactive screen, a smart TV, etc.). In some exemplary embodiments, as shown in FIG. 9, the control method of the embodiment may include the following process.

In act S11, a first image is obtained. For example, a real-time first image acquired by an acquisition device can be continuously obtained.

In act S121, face and hand detection is performed on the first image.

In some examples, for a frame of the first image, a face region can be detected from the first image by using a face detection model, and whether a face in the face region has a first tracking identification can be determined. If the face does not have a first tracking identification, it indicates that the face is detected for the first time, and a first tracking identification can be established for the face. The first tracking identifications of different faces are different. For example, the face region may be indicated by a face detection box which may be a rectangular box. In some examples, a retinaFace algorithm can be used to perform face detection. However, this embodiment is not limited thereto. In other examples, algorithms such as ssd and yolo can be used to perform face detection.

In some examples, for a frame of the first image, a hand region can be detected from the first image by using a hand detection model, and whether a hand in the hand region has a second tracking identification can be determined. If the hand does not have a second tracking identification, it indicates that the hand is detected for the first time, and a second tracking identification may be established for the hand. The second tracking identifications of different hands are different. In some examples, the hand region may be indicated by a hand detection box which may be a rectangular box. In some examples, the shapes and sizes of the hand detection boxes for different hands may vary according to the sizes of the hands. In some examples, an ssd algorithm can be used to perform hand detection. However, this embodiment is not limited thereto. In other examples, an algorithm such as yolo can be used to perform hand detection.

In some examples, a sort algorithm may be used to track and detect a face through the first tracking identification and track and detect a hand through the second tracking identification. However, this embodiment is not limited thereto.

In act S122, whether there is a third target face is recognized.

In some examples, taking an $n^{th}$ frame of the first image as an example, where n is an integer greater than 0, after one or more faces are detected from the $n^{th}$ frame of the first image, a face closest to the center point of the first image can be selected for orientation recognition, that is, to determine whether the face is a front face. Herein, the distance between the face and the center point of the first image can be calculated through the coordinates of the center point of the face region in the first image and the coordinates of the center point of the first image.

In some examples, a face orientation recognition model may be utilized to determine whether a detected face is a front face to determine whether the face is facing the acquisition device. For example, a face detection box where a face is located in the $n^{th}$ frame of the first image can be input into a pre-trained face orientation recognition model, and a recognition result of whether the face is a front face can be output through the face orientation recognition model. The implementation mode of the face orientation recognition model is not limited in this embodiment, as long as the above function can be realized. In other examples, face key points can be extracted (e.g., 68 key points can be extracted) from a face detected from the first image, then a deflection angle of the face in a three-dimensional coordinate system defined by the acquisition device is calculated according to the position information of the key points, and then whether the face is facing the acquisition device is determined according to the deflection angle. For example, if the deflection angle is greater than a preset threshold (e.g., 45 degrees), it can be determined that the face is not facing the acquisition device, otherwise it can be determined that the face is facing the acquisition device.

In some examples, if a same face is recognized in the $n^{th}$ frame of the first image and in consecutive N−1 frames of the first image before the $n^{th}$ frame, i.e., in consecutive N frames of the first image, and the face recognized in the N frames of the first image is always a front face, a result that the third target face is recognized can be returned, and acts S131 and S123 can be performed. If a face that is a front face is not recognized in the $n^{th}$ frame of the first image, or if a face that is a front face is recognized in the $n^{th}$ frame of the first image but the face is not always a front face in consecutive M frames, a result that the third target face is not recognized is returned, and the act S123 can be continued to be performed to recognize a detected hand. In some examples, N may be 10. In some examples, the first tracking identification may be utilized to track the situation of a same face in a plurality of frames of the first image. However, this embodiment is not limited thereto.

In act S131, a video playing function is turned on. In some examples, after the third target face is recognized, it can be determined that there is a user watching the electronic device, and the video playing function of the electronic device can be turned on. For example, a pre-recorded interaction teaching video can be played to guide the user how to interact with the electronic device, or a promotional video can be played to introduce related products or equipment information to the user.

In this example, there is no need to set a face database or perform face registration, which is beneficial to expanding the usage range of users. In some examples, in scenarios such as exhibitions, potential users may be found by the face recognition in this example.

In act S123, whether there is a control hand is recognized.

Figure 10:
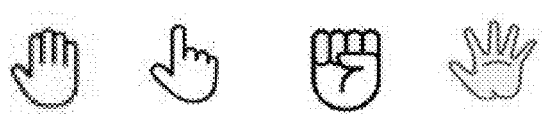
FIG. 10 is a schematic diagram of gestures according to at least one embodiment of the present disclosure.

In some examples, still taking the $n^{th}$ frame of the first image as an example, after at least one hand is detected in the $n^{th}$ frame of the first image, the hand detection box of the at least one hand may be input into a gesture recognition model to obtain a recognition result of a gesture of each hand. The gesture recognition model can support recognition of various gestures, for example, including: a palm of one hand with fingers being together (thumb on the left), an L-shaped gesture, a first of one hand, a palm of one hand with fingers being opened, as shown in FIG. 10 from left to right. Among them, the L-shaped gesture is a gesture with the index finger tip upward and the index finger and the thumb forming an L-shape.

In some examples, for all hands detected in the $n^{th}$ frame of the first image, which have second tracking identifications (including a hand detected in the $n^{th}$ frame of the first image, for which a second tracking identification is established), a distance of movement of a hand indicated by each second tracking identification between any two adjacent frames in consecutive M frames may be calculated. For example, the consecutive M frames may include the $n^{th}$ frame and consecutive M−1 frames preceding the $n^{th}$ frame of the first image. In some examples, M may be an integer greater than 1, for example, M may be 5. However, this embodiment is not limited thereto.

In some examples, for a hand indicated by a second tracking identification, whether the hand is a control hand may be recognized according to a gesture made by the hand in consecutive M frames and a distance of movement of the hand between two adjacent frames. For example, if the hand is recognized as a first gesture in X frames of the first image among consecutive M frames of the first image, and a distance of movement of the hand between any two adjacent frames of the first image among the consecutive M frames of the first image is less than or equal to a first threshold, it is determined that the hand is a control hand. For example, X may be greater than or equal to the product of a second parameter ratio2 and M and the value of the second parameter ratio2 may be 0.6. For example, M=5, X=3. In some examples, when the product of the second parameter and M is a non-integer, X may be obtained by rounding up or down, or rounding, the product of the second parameter and M. In some examples, the first gesture may be a palm of one hand with fingers being together as shown in FIG. 10.

In some examples, taking the $n^{th}$ frame and the $(n-1)^{th}$ frame as an example, a distance of movement of a same hand between the $n^{th}$ frame and the $(n-1)^{th}$ frame of the first image can be calculated by the following formula:

$$dis = \sqrt{(\text{pre\_centerx} - \text{cur\_centerx})^2 + (\text{pre\_centery} - \text{cur\_centery})^2};$$

Herein, dis represents a distance of movement of the same hand between the $n^{th}$ frame and the $(n-1)^{th}$ frame of the first image; pre_centerx represents an abscissa of a reference point of the hand in the $(n-1)^{th}$ frame of the first image, and pre_centery represents an ordinate of the reference point of the hand in the $(n-1)^{th}$ frame of the first image; cur_centerx represents an abscissa of a reference point of the hand in the $n^{th}$ frame of the first image, and cur_centery represents an ordinate of the reference point of the hand in the $n^{th}$ frame of the first image. In this example, it is determined whether there is a movement of the hand between different frames of the first image based on the coordinates of the reference point of the hand in the first image. In some examples, the reference point of the hand can be the midpoint of a bottom edge of a hand detection box where the hand is located, taking the hand detection box being rectangular as an example. However, this embodiment is not limited thereto. In other examples, the reference point of the hand may be the midpoint of an upper edge of a hand detection box where the hand is located, taking the hand detection box being rectangular as an example.

Taking consecutive five frames (i.e. M=5), the $(n-4)^{th}$ frame to the $n^{th}$ frame, of the first image as an example, for a hand indicated by a second tracking identification, a distance dis1 of movement of the hand between the $n^{th}$ frame and the $(n-1)^{th}$ frame, a distance dis2 of movement of the hand between the $(n-1)^{th}$ frame and the $(n-2)^{th}$ frame, a distance dis3 of movement of the hand between the $(n-2)^{th}$ frame and the $(n-3)^{th}$ frame, and a distance dis4 of movement of the hand between the $(n-3)^{th}$ frame and the $(n-4)^{th}$ frame can be obtained through the above formula. When the distances of movement dis1 to dis4 are all less than or equal to the first threshold, it is determined that the hand does not move in the consecutive five frames of the first image. In some examples the first threshold may be equal to the product of a first parameter ratio1 and the length of a short edge of the hand detection box. For example, the value of the first parameter ratio1 may be 0.2. In addition, if the hand is recognized as a first gesture in three of the consecutive five frames of the first image (i.e. X=3), it is determined that the hand is a control hand.

In some examples, if a control hand is recognized in the $n^{th}$ frame of the first image, the control hand can obtain the right to control the electronic device after the gesture control function is turned on. When a plurality of control hands are recognized in the $n^{th}$ frame of the first image, a control hand with the largest average area of trajectory can be selected according to the average areas of trajectory of the plurality of control hands in consecutive M frames (for example, consecutive five frames) of the first image, and the selected control hand can obtain the right to control the electronic device after the gesture control function is turned on. In some examples, a dictionary may be created for each hand with a second tracking identification, and the area of the hand detection box of the hand in each frame of the first image may be stored in the dictionary. For a plurality of control hands, an average area of the hand detection box of each control hand in consecutive M frames of the first image (for example, a ratio of the sum of the areas of the hand detection box in consecutive M frames of the first image to M) can be calculated. Then, the control hand with the largest average area is selected.

In some examples, after the control hand is recognized, the act S141 may be performed to turn on the gesture control function. In some examples, when the video playing function is turned on, the video playing function can be stopped after the control hand is recognized. When no control hand is recognized, the method can return to the act S121 to continue to perform face and hand detection on a next frame of the first image. In some examples, after the control hand is detected and the control hand does not disappear, the determination for recognizing a control hand may be not re-performed, that is, the control right of the gesture control function may be not changed. In some examples, whether the control hand disappears may be determined according to the second tracking identification, which may be cleared following the disappearance of the control hand. In some examples, the recognition process of the third target face and the control hand may be re-performed when the disappearance time of the second tracking identification of the control hand is longer than a first preset duration (e.g., 3 seconds). In this example, by guaranteeing that the control right of the control hand is valid during a continuous period, an operation disorder caused by a plurality of control hands can be avoided. By providing a certain buffer time for the switching between control hands, an operation disorder caused by frequent switching can be avoided.

In some examples, when no face is detected in the $n^{th}$ frame of the first image, the act S123 may be performed to recognize a control hand for a detected hand(s). When no hand is detected in the $n^{th}$ frame of the first image, face and hand detection and recognition is continued to be performed on the $(n+1)^{th}$ frame of the first image.

In other exemplary embodiments, the act S122 and the act S123 may be performed simultaneously, and then the act S131 or act S141 may be performed according to the recognition result of the third target face and the control hand. For example, if the third target face is recognized while the control hand is not recognized, the act S131 is performed to turn on the video playing function. If the third target face is recognized and the control hand is also recognized, or if the third target face is not recognized but the control hand is recognized, the act S141 is performed to turn on the gesture control function. If the third target face and the control hand are not recognized, the act S121 is performed to perform face and hand detection on a next frame of the first image.

In some exemplary embodiments, after the gesture control function is turned on, a first-level functional interface may be opened in the display interface, and the first-level functional interface may be controlled according to a gesture of the control hand. For example, when it is recognized that the control hand is in a second gesture, the movement of a cursor in the first-level functional interface can be controlled according to the movement of the second gesture.

In some examples, a mapping relationship may be established between the first image and the display interface, and a mapping position of the control hand in the display interface may be determined according to the mapping relationship. The position of a cursor in the display interface is obtained by mapping according to the position of the control hand in the first image in real-time. For example, the position of a reference point of the control hand (e.g., the midpoint of the bottom edge of the hand detection box) in a frame of the first image in real time is obtained, and then the position of the cursor in the display interface is calculated according to the following formula.

$$\text{Mouse}_x = (k_x \times \text{hand}_x + b_x) \times \frac{pic_x}{screen_x}$$

$$\text{Mouse}_y = (k_y \times \text{hand}_y + b_y) \times \frac{pic_y}{screen_y}$$

$$k_x = \frac{pic_x}{pic_x - w} b_x = \frac{w}{2} \times \frac{pic_x}{w - pic_x}$$

$$k_y = \frac{pic_y}{pic_y - h} b_y = \frac{h}{2} \times \frac{pic_y}{h - pic_y}$$

Herein, $\text{Mouse}_x$ and $\text{Mouse}_y$ represent the coordinates of the mapped cursor in the coordinate system of the display interface, and $\text{hand}_x$ and $\text{hand}_y$ represent the coordinates of the reference point of the control hand in the coordinate system of the first image. $pic_x$ and $pic_y$, represent the length and the width of the first image captured by the acquisition device, and $screen_x$ and $screen_y$ represent the length and the width of the display interface. In this example, the first image and the display interface are both rectangular as an example.

In some examples the above formula may also include a first constant parameter w and a second constant parameter h. w and h can be used to rectify the coordinates of the mapped cursor, so as to ensure that the function of the cursor will not be affected when the control hand is at an edge of the first image, and avoid the situation that the hand cannot be detected or the classification of a gesture is not accurate because the hand region captured is incomplete when the hand of a person moves to an edge of the first image captured by the acquisition device. In some examples, when the first image is acquired by using a camera with a resolution of 1080p, w=300 and h=200 can be set. However, this embodiment is not limited thereto.

In the following, the electronic device is an interactive screen of a gallery as an example, and the interface interaction after the gesture control function of the interactive screen is turned on is described.

Figure 11A:
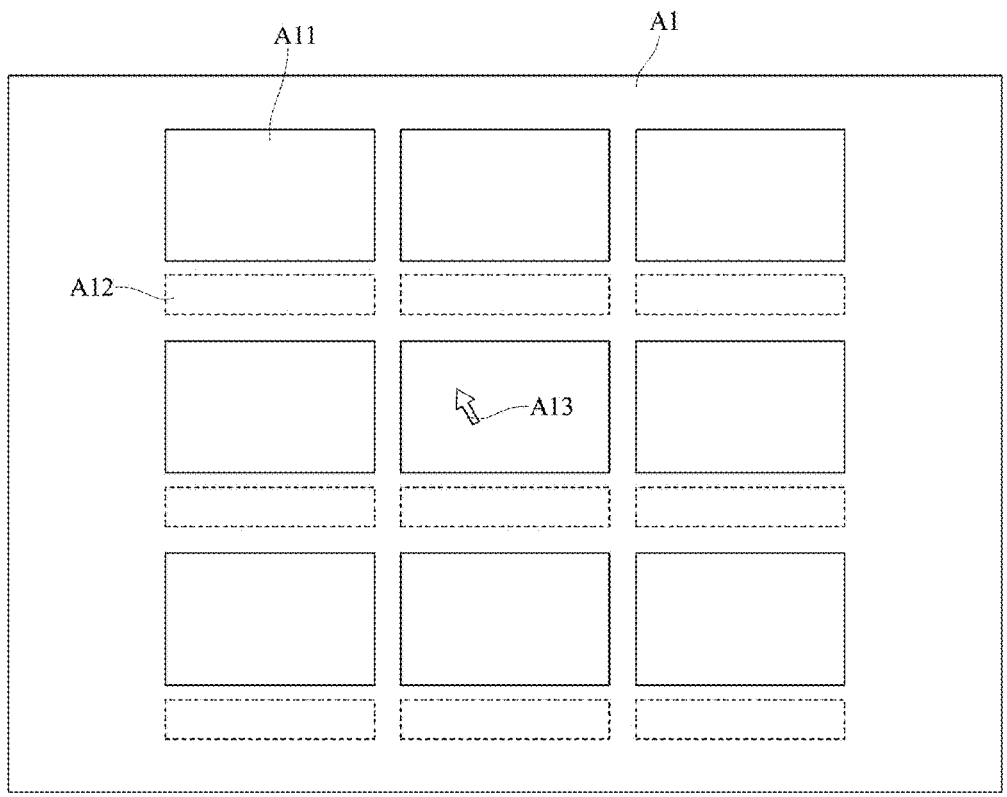
FIG. 11A to FIG. 11C are schematic diagrams of examples of display interfaces after a gesture control function is turned on according to at least one embodiment of the present disclosure.

FIG. 11A is a schematic diagram of an example of display after a first-level functional interface A1 is turned on in a display interface after a gesture control function is turned on. As shown in FIG. 11A, the first-level functional interface A1 may include a plurality of icons A11. The plurality of icons A11 may be arranged in an array, for example, arranged in a 3*3 array. Each icon A11 can be a thumbnail of a painting. An information introduction area A12 can be provided below each icon A11. The information introduction area A12 may display introduction information corresponding to the painting indicated by the icon A11, including, for example, information such as the name of the painting, the painter, etc. In some examples, an interactive gesture prompt area may be provided below the arrangement area of the plurality of icons A11, and at least one interactive gesture for controlling a current icon may be displayed in the interactive gesture prompt area. However, this embodiment is not limited thereto.

In some examples, as shown in FIG. 11A, a cursor A13 of the first-level functional interface A1 can be moved under the control of a control hand in a second gesture (a palm of one hand with fingers being together, as shown in FIG. 10). The cursor A13 may be in a conventional shape such as an oblique arrow shape during movement with the control hand.

Figure 11B:
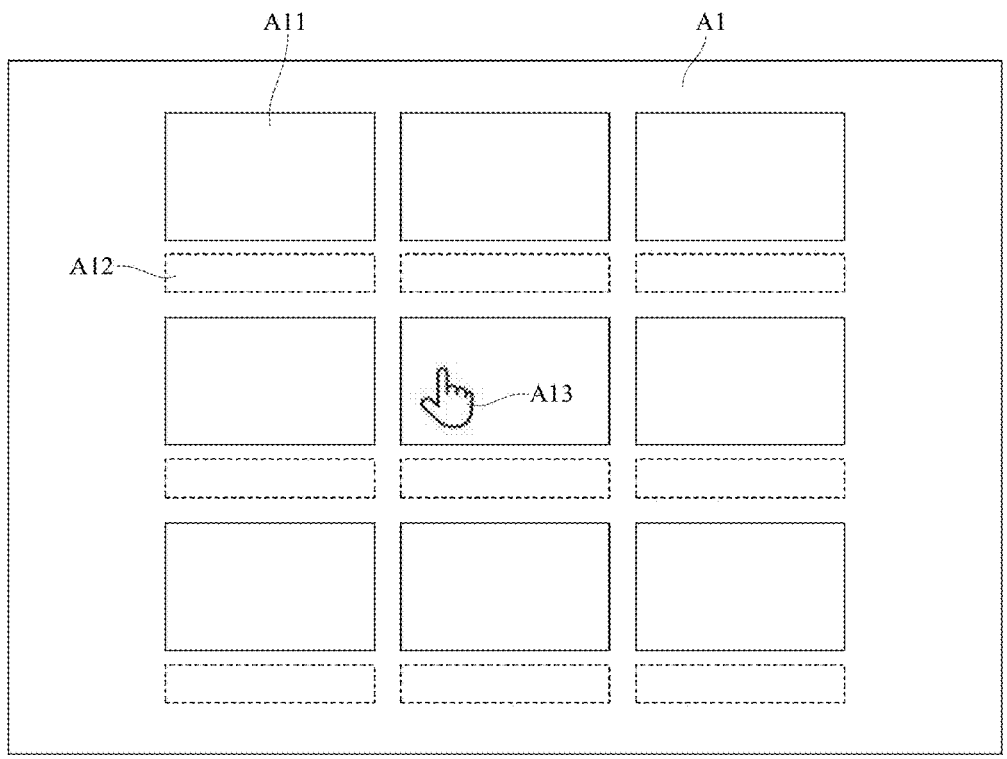
Figure 11C:
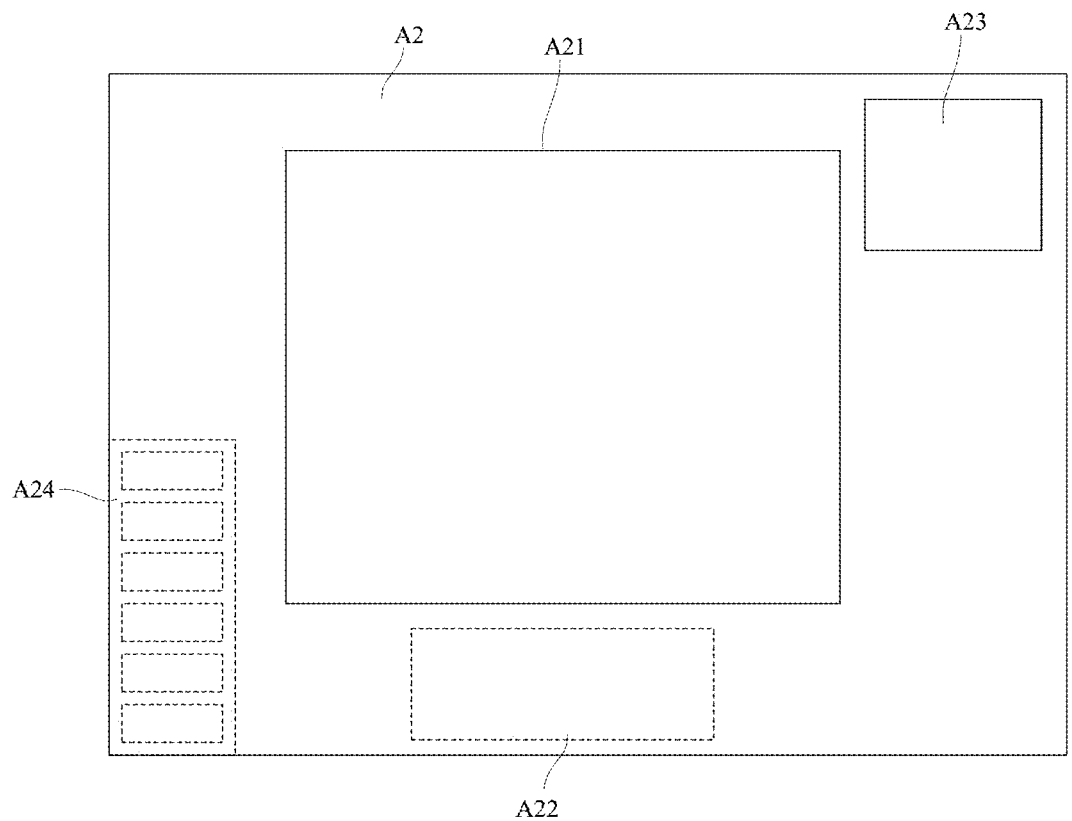

In some examples, when a user of the control hand needs to appreciate the complete picture of the painting indicated by an icon, he/she can change the gesture of the control hand to a third gesture (e.g., the L-shaped gesture as shown in FIG. 10) to select the icon and open a second-level functional interface corresponding to the icon. To select a center icon A11 in the first-level functional interface A1 as an example, the cursor A13 can move to the icon A11 at the center, following the control hand. When it is recognized that the gesture of the control hand is changed to the third gesture, the cursor A13 can be transformed into a shape of an L-shaped gesture, as shown in FIG. 11B, and a second-level functional interface corresponding to the icon A11 is opened in the display interface, as shown in FIG. 11C. In some examples, the interactive screen recognizes the gesture of the control hand in each frame of the first image, and if it detects that the gesture of the control hand is switched from the second gesture to the third gesture in a plurality of consecutive frames (e.g., five consecutive frames) of the first image, it determines to open the second-level functional interface of the corresponding icon, and the complete picture of the corresponding painting can be displayed to the user. In this example, switching from the second gesture to the third gesture of the control hand is equivalent to realizing the conventional mouse double-click function.

In some examples, as shown in FIG. 11C, the second-level functional interface A2 may include a painting display area A21. The painting display area A21 is located at the center of the second-level functional interface A2, and in the painting display area A21, a complete picture of a painting can be displayed. In some examples, a first auxiliary area A22 may be provided below the painting display area A21, to display a prompt signal for an interactive operation of the user. A second auxiliary area A23 may be provided in an upper right corner area of the painting display area A21. The second auxiliary area A23 may display a picture captured by the acquisition device, so that the user can make sure that the control hand is within the capture range of the acquisition device, and it can be prompted to the user that the control hand should not move beyond the capture range of the acquisition device. A third auxiliary area A24 may be provided in a lower left corner area of the painting display area A21. The third auxiliary area A24 may include a plurality of function buttons. The plurality of function buttons may indicate a plurality of operations on the second-level functional interface A2. In some examples, the user may move the control hand to select a function button to realize a corresponding function. The operation of selecting the function button by the control hand is similar to the operation of selecting an icon in the first-level functional interface, and will not be repeated here.

In some examples, in the second-level functional interface, the user can realize a plurality of functions by the control hand. For example, the user can control the display size of the painting in the painting display area, switch the painting displayed in the painting display area, and return to the first-level functional interface.

In some examples, in the second-level functional interface, the display size of a painting can be controlled according to the switching between the gesture of a first of one hand and the gesture of a palm of one hand with fingers being opened, as shown in FIG. 10, of the control hand. The interactive screen can recognize the control hand in each frame. If the interactive screen recognizes that the gesture of the control hand is switched from a first of one hand to a palm of one hand with fingers being opened in a plurality of consecutive frames (e.g. five frames) of the first image, it can determine to adjust the display scale of the painting to a first times of a current display scale (for example, the first times can be greater than 1, such as 1.2), for example, perform a zoom-in operation, and the picture displayed in the second-level functional interface will be adjusted according to the updated scale. If the interactive screen recognizes that the gesture of the control hand is switched from a palm of one hand with fingers being opened to a first of one hand in a plurality of consecutive frames (e.g. five frames) of the first image, it can determine to adjust the display scale of the painting to a second times of the current display scale (for example, the second times can be the reciprocal of the first times), for example, perform a zoom-out operation, and the picture displayed in the second-level functional interface will be adjusted according to the updated scale.

Figure 11D:
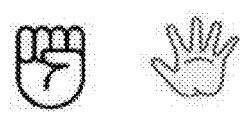
FIG. 11D and FIG. 11E are schematic diagrams of examples of the display in a first auxiliary area in FIG. 11C.

In this example, once the user triggers the adjustment of the display size, for example, it is detected that the display size adjustment operation is performed, the first auxiliary area A22 of the second-level functional interface may display a diagram as shown in FIG. 11D to prompt the user that a zoom-out operation can be implemented by making the gesture of a first of one hand by the control hand, and that a zoom-in operation can be implemented by making the gesture of a palm of one hand with fingers being opened by the control hand.

In some examples, it may be set that a time interval between two adjacent operations need to be greater than or equal to a second preset duration (e.g., 2 seconds), in order to avoid a "rewind" misoperation caused by repeatedly changing the gesture of the control hand to accomplish the zoom operation. For example, after a zoom-in operation is implemented under the control of the control hand, the interactive screen can record the system time when the zoom-in operation is completed. Within the second preset duration after the complete of the zoom-in operation, even if it is detected that the gesture of the control hand is changed, an operation is not performed, but after the second preset duration expires, a corresponding operation is performed according to a detected gesture of the control hand.

In some examples, when a current display scale is larger than an original scale of a painting, a "drag" function of a specific display portion of the painting can be realized by making a preset gesture (e.g., a palm of one hand with fingers being together) by the control hand and moving the control hand, so that specific details of the painting can be watched. For example, a mapping position of the control hand in a coordinate system of the painting can be calculated and the painting is displayed in scale by placing the mapping position at a center point of the display portion. The mapping position of the control hand in the coordinate system of the painting can be calculated by using the above formula for calculating the mapping position of the control hand in the display screen. For example, the screen$_x$ and screen$_y$ in the above calculation formula are used to represent the length and the width of the original size of the painting, and the Mouse$_x$ and Mouse$_y$ obtained by the above calculation formula can represent the mapping coordinates in the coordinate system of the painting. For example, assuming that the original size of the painting is 1920*1080 and an initial coordinate position is the center point of the painting [960, 540], after a zoom-in operation, the display size is adjusted to 1.2 times of the initial size, that is, 2304*1296, and the initial coordinate position is adjusted to obtain the enlarged painting. The mapping position of the control hand in the coordinate system of the original painting can firstly be determined by mapping using the above calculation formula in the coordinate system of the 1920*1080 painting, and then multiplied by 1.2 times and converted into the coordinate system of the enlarged painting. The coordinates of the mapping position of the control hand in the coordinate system of the enlarged painting are taken as a center, and an image with the size of 1920*1080 is cut from the enlarged painting for display. Herein, the part beyond the edge of the cutting range can be supplemented with a black edge.

In some examples, a page turning operation of paintings can be controlled according to horizontal movement amount of the gesture of a palm of one hand with fingers being together of the control hand. For example, the interactive screen can recognize the control hand in each frame, and when detecting that there are Y frames in which the gesture is a palm of one hand with fingers being together among consecutive K frames (e.g., K=5) of the first image, calculate an accumulated displacement distance in the horizontal direction and an accumulated displacement distance in the vertical direction of the control hand in the K frames. When it is detected that the accumulated displacement distance in the horizontal direction is less than or equal to a third threshold and the accumulated displacement distance in the vertical direction is less than or equal to a fourth threshold, an operation of turning page to left is triggered. When the accumulated displacement distance in the horizontal direction is greater than or equal to the fourth threshold and the accumulated displacement distance in the vertical direction is less than or equal to the fourth threshold, an operation of turning page to right is triggered. Herein, Y may be greater than or equal to a second threshold, and the second threshold may be equal to the product of a second parameter (which, for example, may be 0.6) and K. The third threshold may be −2 multiplied by the average value of the short edge of the hand detection box, and the fourth threshold may be 0.5 multiplied by the average value of the short edge of the hand detection box. In some examples, when the display scale of a current interface is equal to the original scale of a painting, the operation of turning page to left can be directly performed, and a previous painting of the current painting can be displayed to the user in the second-level functional interface. When the display scale of the current interface is different from the original scale of the painting, the user can be prompted whether to keep the current scale in page turning or use the original scale in page turning.

Figure 11E:
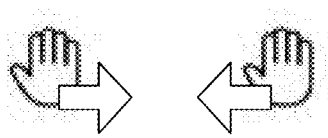

In this example, once a page turning operation is triggered by the user (e.g., page turning is detected), the first auxiliary area A22 of the second-level functional interface may display a diagram as shown in FIG. 11E, to prompt the user that page turning operation can be implemented by making a gesture of a palm of one hand with fingers being together by the control hand and moving the control hand in different horizontal directions.

In some examples, in the second-level functional interface, an operation of returning to the first-level functional interface can be performed according to a gesture of the control hand and the duration of the gesture. For example, the interactive screen may recognize the control hand in each frame, and when detecting that there are Y frames in which the gesture is an L-shaped gesture among consecutive K frames (e.g., K=5) of the first image, the interactive screen may perform the operation of exiting from the second-level functional interface and returning to the first-level functional interface. Herein, Y may be greater than or equal to a second threshold, and the second threshold may be equal to the product of a second parameter (which, for example, may be 0.6) and K. When the interactive screen detects for the first time that the gesture of the control hand is the L-shaped gesture, it may display a diagram of the L-shaped gesture in the first auxiliary area of the second-level functional interface to prompt the user that keeping the L-shaped gesture continuously may cause returning to the first-level functional interface.

In some examples, the relationship between the gestures of the control hand and the corresponding operation functions may be preset.

In this example, for the application scenario of a gallery, a function simulating mouse selection for watching a painting is provided in the first-level functional interface, and a function assisted by gestures for appreciating a painting is provided in the second-level functional interface, which greatly improves the interest and sense of technology of the interactive screen.

At least one embodiment of the present disclosure further provides an electronic device, which includes a display, a processor, and a memory. The display is connected to the processor and is adapted to provide a display interface, and the memory is adapted to store a computer program, and when the computer program is executed by the processor, the acts of the aforementioned control method are implemented.

Figure 12:
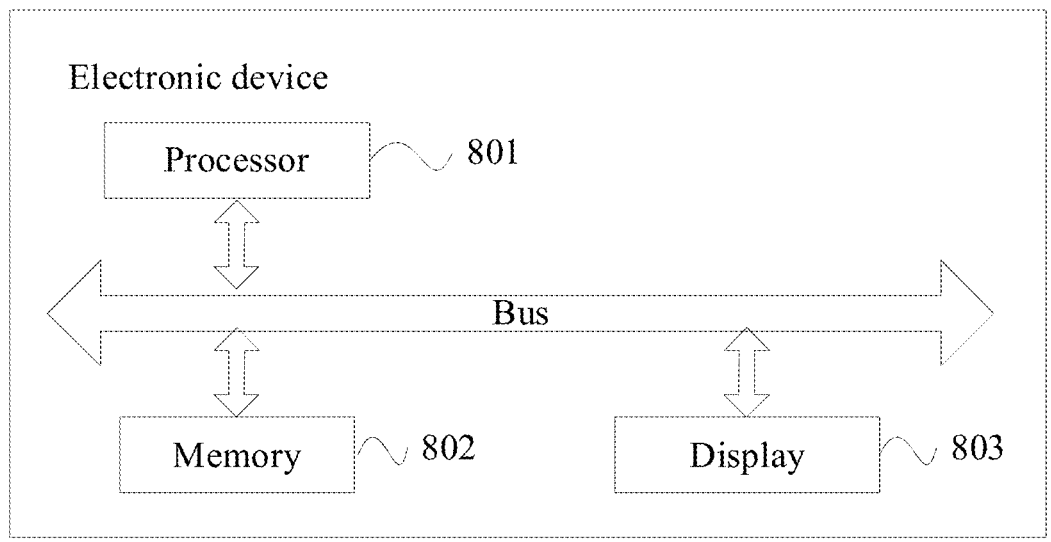
FIG. 12 is a schematic diagram of an electronic device according to at least one embodiment of the present disclosure.

FIG. 12 is an exemplary diagram of an electronic device according to at least one embodiment of the disclosure. As shown in FIG. 12, the electronic device provided in this embodiment (such as a smart TV, an exhibition hall display screen) includes a processor 801, a memory 802, and a display 803. The processor 801, the memory 802, and the display 803 may be connected through a bus. The display 803 is adapted to provide a display interface; the memory 802 is adapted to store a computer program, when the computer program is executed by the processor 801, the acts of the control method according to the above embodiments are implemented.

In some examples, a structure of the electronic device shown in FIG. 12 does not constitute a limitation on the electronic device, and may include more or fewer components than shown in the figure, or combine some components, or provide different component arrangements.

In some examples, the processor 801 may include, but is not limited to, a processing apparatus such as a Microcontroller Unit (MCU) or a Field Programmable Gate Array (FPGA). The memory 802 may store software programs and modules of application software, such as program instructions or modules corresponding to the control method according to this embodiment. The processor 801 executes various functional applications and data processing, for example, implements the control method according to this embodiment, by running the software programs and modules stored in the memory 802. The memory 802 may include a high-speed random access memory, and may also include a non-volatile memory such as one or more magnetic storage apparatuses, flash memories, or other non-volatile solid-state memories. In some examples, the memory 802 may include memories remotely provided with respect to the processor 801, and these remote memories may be connected to the electronic device through a network. Examples of the above network include, but are not limited to, the Internet, the intranet, a local area network, a mobile communication network, and combinations thereof.

In some examples, the display 803 may be adapted to display information input by a user or information provided to the user. The display 803 may include a display panel, such as a liquid crystal display and an organic light emitting diode. However, this embodiment is not limited thereto.

In addition, at least one embodiment of the present disclosure further provides a computer-readable storage medium storing a computer program, when the computer program is executed by a processor, the acts of the above control method are implemented.

Those of ordinary skill in the art may understand that all or some of the acts in the method, functional modules or units in the system and apparatus disclosed above may be implemented as software, firmware, hardware, and an appropriate combination thereof. In a hardware implementation, a division between functional modules or units mentioned in the above description does not necessarily correspond to a division of physical components. For example, a physical component may have plurality of functions, or a function or an act may be performed by several physical components in cooperation. Some components or all components may be implemented as software executed by a processor such as a digital signal processor or a microprocessor, or implemented as hardware, or implemented as integrated circuits such as application specific integrated circuits. Such software may be distributed in a computer-readable medium, and the computer-readable medium may include a computer storage medium (or a non-transitory medium) and a communication medium (or a transitory medium). As known to those of ordinary skill in the art, the term computer storage medium includes volatile and nonvolatile and removable and irremovable media implemented in any method or technology for storing information (for example, a computer-readable instruction, a data structure, a program module, or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage or another magnetic storage apparatus, or any other medium that may be used for storing desired information and may be accessed by a computer. In addition, it is known to those of ordinary skill in the art that the communication medium usually includes a computer-readable instruction, a data structure, a program module, or other data in a modulated data signal of, such as, a carrier or another transmission mechanism, and may include any information transmission medium.

The above shows and describes basic principles, main features, and advantages of the present disclosure. The present disclosure is not limited by the above embodiments. The above embodiments and descriptions in the specification only illustrate the principles of the present disclosure. Without departing from the spirit and scope of the present disclosure, there will be many changes and improvements in the present disclosure, and all of these changes and improvements fall within the protection scope of the present disclosure.

The invention claimed is:

1. A control method, of an electronic device, wherein the electronic device comprises a processor, a memory, and a display, the method comprising:
   obtaining, by the processor, a first image;
   performing, by the processor, face recognition and gesture recognition on the first image;
   determining, by the processor, to control the electronic device through a gesture when a first target face is recognized from the first image and a first target gesture is recognized from the first image;
   returning to, by the processor, the obtaining by the processor the first image when the first target face is not recognized from the first image or the first target gesture is not recognized from the first image;
   determining, by the processor, to control the electronic device through the gesture when a control hand is recognized from at least one frame of the first image; and
   playing, by the processor, a video when a third target face is recognized from at least one frame of the first image and the control hand is not recognized from the at least one frame of the first image.

2. The method according to claim 1, further comprising: providing, by the processor, first prompt information on a display interface when the first target face is recognized from the first image and the first target gesture is recognized from the first image, wherein the first prompt information is used for prompting a user that the processor determines to control the electronic device through the gesture.

3. The method according to claim 1, further comprising:
   providing, by the processor, second prompt information on a display interface when the first target face is recognized from the first image and the first target gesture is not recognized from the first image, wherein the second prompt information is used for prompting a user to adjust a gesture; or
   providing, by the processor, third prompt information on a display interface when the first target face is not recognized from the first image, wherein the third prompt information is used for prompting a user to adjust an angle of a face facing an acquisition device.

4. The method according to claim 1, further comprising:
   obtaining, by the processor, a second image after the processor determines to control the electronic device through the gesture, and performing, by the processor, the face recognition and the gesture recognition on the second image; and determining, by the processor, to control the electronic device through a corresponding second target gesture when a second target face is recognized from the second image and the second target gesture is recognized from the second image;

or, returning to, by the processor, the obtaining, by the processor, the second image when the second target face is not recognized from the second image or the second target gesture is not recognized from the second image; and determining, by the processor, not to control the electronic device through any gesture when the second target face is not recognized from second images of consecutive multiple frames within a set time period.

5. The method according to claim 1, wherein the gesture recognition on the first image comprises: determining, by the processor, a second tracking identification of at least one hand detected from the first image, wherein different hands have different second tracking identifications;

determining, by the processor, a position and a gesture of the at least one hand in a plurality of consecutive frames of the first image according to the second tracking identification of the at least one hand, wherein the plurality of consecutive frames of the first image comprises a current frame of the first image and at least one frame of the first image before the current frame of the first image; and recognizing, by the processor, the control hand in the at least one hand according to the position and the gesture of the at least one hand in the plurality of consecutive frames of the first image.

6. The method according to claim 5, wherein recognizing, by the processor, the control hand in the at least one hand according to the position and the gesture of the at least one hand in the plurality of consecutive frames of the first image comprises:

when detecting a same hand in consecutive M frames of the first image, and recognizing that the hand is in a first gesture in X frames of the first image among the M frames of the first image, and that a distance of movement of the hand in any two adjacent frames of the first image among the M frames of the first image is less than or equal to a first threshold, recognizing, by the processor, the hand as the control hand; wherein X is less than or equal to M, and both X and M are integers.

7. The method according to claim 6, wherein recognizing, by the processor, the control hand in the at least one hand according to the position and the gesture of the at least one hand in the plurality of consecutive frames of the first image further comprises: when detecting a plurality of control hands during a recognition process of a frame of the first image, selecting, by the processor, the control hand with the largest average area of trajectory in the consecutive M frames of the first image from the plurality of control hands.

8. The method according to claim 1, wherein the face recognition on the first image comprises: determining, by the processor, a first tracking identification of at least one face detected from the first image, wherein different faces have different first tracking identifications;

determining, by the processor, whether the at least one face is a front face in a plurality of consecutive frames of the first image according to the first tracking identification of the at least one face, wherein the plurality of consecutive frames of the first image comprises a current frame of the first image and at least one frame of the first image before the current frame of the first image; and when detecting a same face that is a front face in the plurality of consecutive frames of the first image, returning, by the processor, a result that the third target face is recognized.

9. The method according to claim 1, further comprising: after the processor determines to control the electronic device through the gesture, opening, by the processor, a first-level functional interface on a display interface, and controlling, by the processor, the first-level functional interface according to a gesture of the control hand.

10. The method according to claim 9, wherein controlling, by the processor, the first-level functional interface according to the gesture of the control hand comprises at least one of the following:

when recognizing that the control hand is in a second gesture, controlling, by the processor, movement of a cursor in the first-level functional interface according to movement of the second gesture; or when recognizing that the control hand is in a third gesture, turning on, by the processor, a function indicated by an icon corresponding to a mapping position of the control hand in the display interface.

11. The method according to claim 10, wherein turning on, by the processor, the function indicated by the icon corresponding to the mapping position of the control hand in the display interface comprises: opening, by the processor, a second-level functional interface indicated by the icon;

the method further comprises at least one of the following:

controlling, by the processor, a display size adjustment operation of the second-level functional interface according to a gesture change of the control hand;

controlling, by the processor, a page turning operation in the second-level functional interface according to the gesture of the control hand and a moving direction of the gesture; or controlling, by the processor, an operation of returning from the second-level functional interface to the first-level functional interface according to a gesture of the control hand and a duration of the gesture.

12. An electronic device, comprising: a processor, a memory, and a display, wherein the display is connected to the processor and is adapted to provide a display interface;

the memory is used to store a computer program, and when the processor executes the computer program, the processor performs:

obtaining a first image;

performing face recognition and gesture recognition on the first image;

determining to control the electronic device through a gesture when a first target face is recognized from the first image and a first target gesture is recognized from the first image;

returning to the obtaining the first image when the first target face is not recognized from the first image or the first target gesture is not recognized from the first image;

determining to control the electronic device through a gesture when a control hand is recognized from at least one frame of the first image; and playing a video when a third target face is recognized from at least one frame of the first image and the control hand is not recognized from the at least one frame of the first image.

13. The electronic device according to claim 12, wherein the gesture recognition on the first image comprises: determining a second tracking identification of at least one hand detected from the first image, wherein different hands have different second tracking identifications;
  determining a position and a gesture of the at least one hand in a plurality of consecutive frames of the first image according to the second tracking identification of the at least one hand, wherein the plurality of consecutive frames of the first image comprises a current frame of the first image and at least one frame of the first image before the current frame of the first image; and
  recognizing the control hand in the at least one hand according to the position and the gesture of the at least one hand in the plurality of consecutive frames of the first image.

14. The electronic device according to claim 13, wherein the recognizing the control hand in the at least one hand according to the position and the gesture of the at least one hand in the plurality of consecutive frames of the first image comprises:
  when detecting a same hand in consecutive M frames of the first image, and recognizing that the hand is in a first gesture in X frames of the first image among the M frames of the first image, and that a distance of movement of the hand in any two adjacent frames of the first image among the M frames of the first image is less than or equal to a first threshold, recognizing the hand as the control hand; wherein X is less than or equal to M, and both X and M are integers.

15. A non-transitory computer-readable storage medium, storing a computer program, wherein the computer program, when executed by a processor, causes the processor to perform:
  obtaining a first image;
  performing face recognition and gesture recognition on the first image;
  determining to control the electronic device through a gesture when a first target face is recognized from the first image and a first target gesture is recognized from the first image;
  returning to the obtaining the first image when the first target face is not recognized from the first image or the first target gesture is not recognized from the first image-;
  determining to control the electronic device through a gesture when a control hand is recognized from at least one frame of the first image; and
  playing a video when a third target face is recognized from at least one frame of the first image and the control hand is not recognized from the at least one frame of the first image.

16. The non-transitory computer-readable storage medium according to claim 15, wherein the gesture recognition on the first image comprises: determining a second tracking identification of at least one hand detected from the first image, wherein different hands have different second tracking identifications;
  determining a position and a gesture of the at least one hand in a plurality of consecutive frames of the first image according to the second tracking identification of the at least one hand, wherein the plurality of consecutive frames of the first image comprises a current frame of the first image and at least one frame of the first image before the current frame of the first image; and
  recognizing the control hand in the at least one hand according to the position and the gesture of the at least one hand in the plurality of consecutive frames of the first image.

* * * * *